United States Patent
Elshafie et al.

(10) Patent No.: US 12,052,779 B2
(45) Date of Patent: Jul. 30, 2024

(54) DEMODULATION REFERENCE SIGNAL BUNDLING FOR SIDELINK COMMUNICATIONS

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/402,458

(22) Filed: Aug. 13, 2021

(65) Prior Publication Data
US 2023/0050382 A1 Feb. 16, 2023

(51) Int. Cl.
*H04W 76/14* (2018.01)
*H04B 7/02* (2018.01)
*H04L 1/16* (2023.01)
*H04L 1/1829* (2023.01)
*H04L 1/1867* (2023.01)
(Continued)

(52) U.S. Cl.
CPC .......... *H04W 76/14* (2018.02); *H04L 1/1896* (2013.01); *H04L 5/0051* (2013.01); *H04W 72/02* (2013.01); *H04W 72/0453* (2013.01); *H04W 72/046* (2013.01)

(58) Field of Classification Search
CPC . H04W 76/14; H04W 72/02; H04W 72/0453; H04W 72/046; H04L 1/1896; H04L 5/0051
See application file for complete search history.

(56) References Cited

U.S. PATENT DOCUMENTS 11,510,166 B1 * 11/2022 Abedini ................ H04W 72/23
2018/0132200 A1 * 5/2018 Gheorghiu .......... H04W 88/027
(Continued)

FOREIGN PATENT DOCUMENTS

WO  WO-2021035458 A1  3/2021

OTHER PUBLICATIONS

International Search Report and Written Opinion—PCT/US2022/073995—ISA/EPO—Oct. 12, 2022.

*Primary Examiner* — Xuan Lu

(74) *Attorney, Agent, or Firm* — Holland & Hart LLP

(57) ABSTRACT

Methods, systems, and devices for wireless communication are described. A first wireless device may establish a sidelink communications link with a second wireless device. The first wireless device may transmit, to the second wireless device, an indication of a capability to support a configuration for phase continuity between multiple physical channel transmissions of the sidelink communication link. The first wireless device may transmit one or more physical channel transmissions, which each may be associated with a set of one or more demodulation reference signals (DMRSs) to the second wireless device in accordance with the indicated configuration for phase continuity between the physical channel transmissions. The second wireless device may determine channel parameters associated with the one or more physical channel transmissions based on a joint channel estimation associated with the one or more sets of DMRSs.

30 Claims, 13 Drawing Sheets

(51) Int. Cl.
  *H04L 5/00*     (2006.01)
  *H04W 72/02*    (2009.01)
  *H04W 72/044*   (2023.01)
  *H04W 72/0453*  (2023.01)

(56)         References Cited

U.S. PATENT DOCUMENTS

2020/0313825 A1* 10/2020 Ryu ........................ H04L 5/001
2020/0396599 A1  12/2020 Luo et al.
2021/0194556 A1   6/2021 Ly et al.
2022/0029859 A1*  1/2022 Park .................... H04L 25/0202
2022/0078050 A1*  3/2022 Marshall ............. H04L 25/0224
2022/0224456 A1*  7/2022 Yi .......................... H04W 72/23
2022/0369346 A1* 11/2022 Xu ....................... H04W 72/543
2022/0377778 A1* 11/2022 Yi ......................... H04W 72/20
2023/0007730 A1*  1/2023 Zeng .................... H04W 76/28
2023/0044215 A1*  2/2023 Wang .................... H04L 5/0094
2023/0291523 A1*  9/2023 Hasegawa ............. H04L 5/0094

* cited by examiner

DEMODULATION REFERENCE SIGNAL BUNDLING FOR SIDELINK COMMUNICATIONS

FIELD OF TECHNOLOGY

The following relates to wireless communication, including demodulation reference signal bundling for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support demodulation reference signal (DMRS) bundling for sidelink communications. For example, a wireless communications system may be configured to support bundling of sidelink DMRSs (e.g., by a transmitting device), which may support joint channel estimation (e.g., by a sidelink receiving device) for a sidelink transmission time interval (TTI) that is based on measurement of DMRSs associated with multiple sidelink TTIs (e.g., including the sidelink TTI and one or more other sidelink TTIs). In some such systems, sidelink DMRS bundling and joint channel estimation may be supported by or enabled by performing sidelink physical channel transmissions in accordance with phase continuity between the transmissions, which may be associated with a same frequency resource allocation, a same transmit power, a same power amplifier (PA) state, or a same spatial transmission relation (e.g., same antenna ports, same precoding), among other continuous or coherent configurations or combinations thereof. By supporting such joint channel estimation, and various capability and configuration signaling techniques for indicating physical channel transmissions in accordance with such bundling or phase continuity, a sidelink receiving device may estimate a channel between the sidelink receiving device and a sidelink transmitting device using an increased quantity of DMRSs, without such an increased quantity of DMRSs occupying a same sidelink TTI and otherwise displacing other communications of the sidelink TTI. A relatively higher quantity of DMRSs may support a relatively higher quality channel estimation, which may improve one or more aspects of sidelink communications, including more-reliably received or demodulated sidelink communications.

A method for wireless communication is described. The method may include establishing, at a first wireless device, a sidelink communications link with a second wireless device, transmitting, to the second wireless device, an indication of a capability of the first wireless device to support a configuration for phase continuity between physical channel transmissions of the sidelink communications link, and transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

An apparatus for wireless communication is described. The apparatus may include a processor, memory coupled with the processor, and instructions stored in the memory. The instructions may be executable by the processor to cause the apparatus to establish, at a first wireless device, a sidelink communications link with a second wireless device, transmit, to the second wireless device, an indication of a capability of the first wireless device to support a configuration for phase continuity between physical channel transmissions of the sidelink communications link, and transmit, by the first wireless device and based on transmitting the indication of the capability of the first wireless device, one or more physical channel transmissions to the second wireless device in accordance with the indicated configuration for phase continuity between physical channel transmissions of the sidelink communications link.

Another apparatus for wireless communication is described. The apparatus may include means for establishing, at a first wireless device, a sidelink communications link with a second wireless device, means for transmitting, to the second wireless device, an indication of a capability of the first wireless device to support a configuration for phase continuity between physical channel transmissions of the sidelink communications link, and means for transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

A non-transitory computer-readable medium storing code for wireless communication is described. The code may include instructions executable by a processor to establish, at a first wireless device, a sidelink communications link with a second wireless device, transmit, to the second wireless device, an indication of a capability of the first wireless device to support a configuration for phase continuity between physical channel transmissions of the sidelink communications link, and transmit, by the first wireless device and based on transmitting the indication of the capability of the first wireless device, one or more physical channel transmissions to the second wireless device in accordance with the indicated configuration for phase continuity between physical channel transmissions of the sidelink communications link.

In some examples of the method, apparatuses, and non-transitory computer-readable medium described herein, transmitting the one or more physical channel transmissions may include operations, features, means, or instructions for transmitting, during a first transmission time interval, a first physical channel transmission over the sidelink communications link, the first physical channel transmission associated with a first set of one or more demodulation reference signals, and transmitting, during a second transmission time interval, a second physical channel transmission over the sidelink communications link, the second physical channel transmission associated with a second set of one or more demodulation reference signals. In some examples, the first set of one or more demodulation reference signals and the second set of one or more demodulation reference signals is configured for joint channel estimation.

Some examples of the method, apparatuses, and non-transitory computer-readable medium described herein may further include operations, features, means, or instructions for transmitting, during the first transmission time interval or the second transmission time interval, an indication that the first set of one or more demodulation reference signals and the second set of one or more demodulation reference signals are configured for joint channel estimation.

Some examples of the method, apparatuses, and non-transitory computer-readable medium described herein may further include operations, features, means, or instructions for transmitting, before the first transmission time interval, radio resource control signaling or medium access control signaling that indicates a duration for activating the configuration for phase continuity between physical channel transmissions of the sidelink communications link, and the first transmission time interval and the second transmission time interval may be within the indicated duration.

In some examples of the method, apparatuses, and non-transitory computer-readable medium described herein, the first physical channel transmission and the second physical channel transmission may be transmitted with a same resource in the frequency domain, with a same transmission power, with a same resource in the spatial domain, with a same antenna port, or with a same precoding, or any combination thereof.

In some examples of the method, apparatuses, and non-transitory computer-readable medium described herein, the configuration for joint channel estimation may be based on a duration between the first transmission time interval and the second transmission time interval being less than or equal to a threshold.

Some examples of the method, apparatuses, and non-transitory computer-readable medium described herein may further include operations, features, means, or instructions for performing feedback operations in accordance with a negative-acknowledgment-only feedback configuration, or refraining from performing a transmission of the feedback operations, based on a resource pool associated with the feedback operations being different than a resource pool associated with the second channel, or a duration between a feedback physical channel and the second physical channel, or both.

Some examples of the method, apparatuses, and non-transitory computer-readable medium described herein may further include operations, features, means, or instructions for transmitting the one or more physical channel transmissions in accordance with the indicated configuration for phase continuity may be based on a priority or a quality of service associated with the one or more physical channel transmissions.

Some examples of the method, apparatuses, and non-transitory computer-readable medium described herein may further include operations, features, means, or instructions for receiving a request from the second wireless device to perform transmissions in accordance with the configuration for phase continuity, and transmitting the one or more physical channel transmissions may be in accordance with the indicated configuration for phase continuity based on receiving the request.

Some examples of the method, apparatuses, and non-transitory computer-readable medium described herein may further include operations, features, means, or instructions for receiving an indication of a capability of the second wireless device to support the configuration for phase continuity between physical channel transmissions of the sidelink communications link, and transmitting the one or more physical channel transmissions may be in accordance with the indicated configuration for phase continuity based on receiving the indication of the capability of the second wireless device.

In some examples of the method, apparatuses, and non-transitory computer-readable medium described herein, the one or more physical channel transmissions may be transmitted using a resource pool, associated with the established sidelink communications link, that is allocated to sidelink transmissions in accordance with the configuration for phase continuity between physical channel transmissions.

In some examples of the method, apparatuses, and non-transitory computer-readable medium described herein, transmitting the one or more physical channel transmissions may include operations, features, means, or instructions for transmitting the one or more physical channel transmissions in accordance with the indicated configuration for phase continuity using a first modem, associated with the sidelink communications link, that is different than a second modem associated with communications between the first wireless device and a base station.

In some examples of the method, apparatuses, and non-transitory computer-readable medium described herein, the configuration for phase continuity between physical channel transmissions of the sidelink communications link may be associated with phase continuity between physical sidelink control channel transmissions, phase continuity between physical sidelink shared channel transmissions, or physical sidelink feedback channel transmissions, or a combination thereof.

In some examples of the method, apparatuses, and non-transitory computer-readable medium described herein, the indication of the capability of the first wireless device to support the configuration for phase continuity between physical channel transmissions of the sidelink communications link includes a respective capability indication for each physical channel of a set of one or more physical channels, for each resource pool of a set of one or more resource pools, or for a combination thereof.

A method for wireless communication is described. The method may include establishing, at a first wireless device, a sidelink communications link with a second wireless device, receiving, from the second wireless device, an indication of a capability of the second wireless device to support a configuration for phase continuity between physical channel transmissions of the sidelink communications link, and receiving, by the first wireless device and based on receiving the indication of the capability of the second wireless device, one or more physical channel transmissions from the second wireless device in accordance with the indicated configuration for phase continuity between physical channel transmissions of the sidelink communications link.

An apparatus for wireless communication is described. The apparatus may include a processor, memory coupled with the processor, and instructions stored in the memory. The instructions may be executable by the processor to cause the apparatus to establish, at a first wireless device, a sidelink communications link with a second wireless device, receive, from the second wireless device, an indication of a capability of the second wireless device to support a configuration for phase continuity between physical channel transmissions of the sidelink communications link, and receive, by the first wireless device and based on receiving the indication of the capability of the second wireless device, one or more physical channel transmissions from the second wireless device in accordance with the indicated configuration for phase continuity between physical channel transmissions of the sidelink communications link.

Another apparatus for wireless communication is described. The apparatus may include means for establishing, at a first wireless device, a sidelink communications link with a second wireless device, means for receiving, from the second wireless device, an indication of a capability of the second wireless device to support a configuration for phase continuity between physical channel transmissions of the sidelink communications link, and means for receiving, by the first wireless device and based on receiving the indication of the capability of the second wireless device, one or more physical channel transmissions from the second wireless device in accordance with the indicated configuration for phase continuity between physical channel transmissions of the sidelink communications link.

A non-transitory computer-readable medium storing code for wireless communication is described. The code may include instructions executable by a processor to establish, at a first wireless device, a sidelink communications link with a second wireless device, receive, from the second wireless device, an indication of a capability of the second wireless device to support a configuration for phase continuity between physical channel transmissions of the sidelink communications link, and receive, by the first wireless device and based on receiving the indication of the capability of the second wireless device, one or more physical channel transmissions from the second wireless device in accordance with the indicated configuration for phase continuity between physical channel transmissions of the sidelink communications link.

In some examples of the method, apparatuses, and non-transitory computer-readable medium described herein, receiving the one or more physical channel transmissions may include operations, features, means, or instructions for receiving, during a first transmission time interval, a first physical channel transmission over the sidelink communications link, the first physical channel transmission associated with a first set of one or more demodulation reference signals, and receiving, during a second transmission time interval, a second physical channel transmission over the sidelink communications link, the second physical channel transmission associated with a second set of one or more demodulation reference signals. In some examples, the first set of one or more demodulation reference signals and the second set of one or more demodulation reference signals may be configured for joint channel estimation.

Some examples of the method, apparatuses, and non-transitory computer-readable medium described herein may further include operations, features, means, or instructions for determining a channel parameter associated with the first physical channel transmission, a channel parameter associated with the second physical channel transmission, or both based on a joint channel estimation associated with the first set of one or more demodulation reference signals and the second set of one or more demodulation reference signals.

Some examples of the method, apparatuses, and non-transitory computer-readable medium described herein may further include operations, features, means, or instructions for receiving, during the first transmission time interval or the second transmission time interval, an indication that the first set of one or more demodulation reference signals and the second set of one or more demodulation reference signals are configured for joint channel estimation.

Some examples of the method, apparatuses, and non-transitory computer-readable medium described herein may further include operations, features, means, or instructions for receiving, before the first transmission time interval, radio resource control signaling or medium access control signaling that indicates a duration for activating the configuration for phase continuity between physical channel transmissions of the sidelink communications link, and the first transmission time interval and the second transmission time interval may be within the indicated duration.

In some examples of the method, apparatuses, and non-transitory computer-readable medium described herein, the configuration for joint channel estimation may be based on a duration between the first transmission time interval and the second transmission time interval being less than or equal to a threshold.

Some examples of the method, apparatuses, and non-transitory computer-readable medium described herein may further include operations, features, means, or instructions for receiving a feedback physical channel in accordance with a negative-acknowledgment-only feedback configuration based on a resource pool associated with the feedback operations being different than a resource pool associated with the second physical channel, or a duration between the feedback physical channel and the second physical channel, or a combination thereof.

Some examples of the method, apparatuses, and non-transitory computer-readable medium described herein may further include operations, features, means, or instructions for receiving the one or more physical channel transmissions in accordance with the indicated configuration for phase continuity based on a priority or a quality of service associated with the one or more physical channel transmissions.

Some examples of the method, apparatuses, and non-transitory computer-readable medium described herein may further include operations, features, means, or instructions for transmitting a request to the second wireless device to perform transmissions in accordance with the configuration for phase continuity, and receiving the one or more physical channel transmissions may be in accordance with the indicated configuration for phase continuity based on transmitting the request.

Some examples of the method, apparatuses, and non-transitory computer-readable medium described herein may further include operations, features, means, or instructions for transmitting an indication of a capability of the first wireless device to support the configuration for phase continuity between physical channel transmissions of the sidelink communications link, and receiving the one or more physical channel transmissions may be in accordance with the indicated configuration for phase continuity based on transmitting the indication of the capability of the first wireless device.

In some examples of the method, apparatuses, and non-transitory computer-readable medium described herein, the one or more physical channel transmissions may be received using a resource pool, associated with the established sidelink communications link, that is allocated to sidelink transmissions in accordance with the configuration for phase continuity between physical channel transmissions.

In some examples of the method, apparatuses, and non-transitory computer-readable medium described herein, receiving the one or more physical channel transmissions may include operations, features, means, or instructions for receiving the one or more physical channel transmissions in accordance with the indicated configuration for phase continuity using a first modem, associated with the sidelink communications link, that is different than a second modem associated with communications between the first wireless device and a base station.

In some examples of the method, apparatuses, and non-transitory computer-readable medium described herein, the configuration for phase continuity between physical channel transmissions of the sidelink communications link may be associated with phase continuity between physical sidelink control channel transmissions, phase continuity between physical sidelink shared channel transmissions, or physical sidelink feedback channel transmissions, or a combination thereof.

In some examples of the method, apparatuses, and non-transitory computer-readable medium described herein, the indication of the capability of the second wireless device to support the configuration for phase continuity between physical channel transmissions of the sidelink communications link includes a respective capability indication for each physical channel of a set of one or more physical channels, for each resource pool of a set of one or more resource pools, or for a combination thereof.

DETAILED DESCRIPTION

Figure 1:
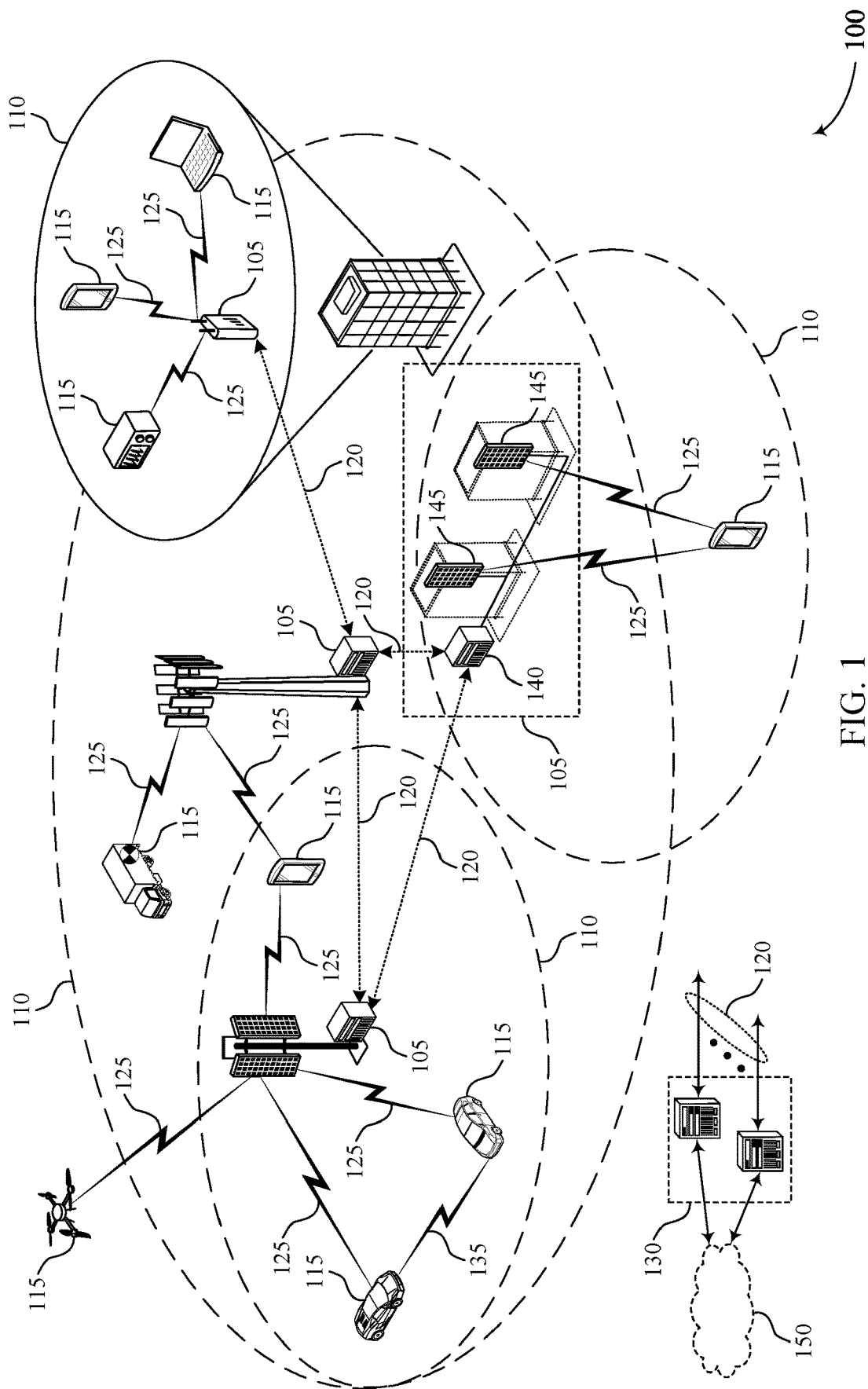
FIG. 1 illustrates an example of a wireless communications system that supports demodulation reference signal bundling for sidelink communications in accordance with aspects of the present disclosure.

The described techniques relate to improved methods, systems, devices, and apparatuses that support bundling, such as demodulation reference signal (DMRS) bundling for sidelink communications.

In some wireless communications, a physical transmission may be allocated to or scheduled to use communication resources of a transmission time interval (TTI), such as a resource block, a slot, a mini-slot, or some other set of communications resources. To support the reception of a physical transmission, the physical transmission may include or be otherwise associated with one or more DMRSs of the TTI, which may be measured by a receiving device for various channel estimation techniques (e.g., for normalizing or otherwise compensating for a signal propagation path between the receiving device and a transmitting device). In some examples, channel estimation may be used to establish reference characteristics of the physical transmission, which may be used to demodulate data symbols carried on frequency resources of the physical transmission.

Some wireless communications systems may support sidelink communications, where wireless devices may communicate with each other directly (e.g., without communications being relayed by a base station or other network entity). In various techniques for sidelink communications, communications between wireless devices may be scheduled by a network entity (e.g., in accordance with a sidelink Mode 1 resource allocation scheme), or communications resources may be allocated for selection and reservation by wireless devices for sidelink communications that are not, themselves, scheduled by a network entity (e.g., in accordance with a sidelink Mode 2 resource allocation scheme). Sidelink communications are increasingly being used to support implementations that involve high-reliability communications, such as vehicle-to-vehicle (V2V) or vehicle-to-everything (V2X) deployments, industrial Internet of Things (IIOT) deployments, or ultra-reliable low-latency communication (URLLC) deployments, among others. Such deployments may benefit from techniques that support relatively high-reliability wireless communications, including sidelink reference signal techniques that support reception of physical transmissions with relatively low occurrence of errors.

In accordance with examples as disclosed herein, a wireless communications system may be configured to support bundling of sidelink reference signals, such as DMRSs (e.g., by a sidelink transmitting device), which may support joint channel estimation (e.g., by a sidelink receiving device) for a sidelink TTI that is based on measurement of the reference signals, such as the DMRSs, associated with multiple sidelink TTIs (e.g., including the sidelink TTI and one or more other sidelink TTIs). In some such systems, sidelink DMRS bundling may be supported by or enabled by performing sidelink physical channel transmissions in accordance with phase continuity between such transmissions, which may be associated with maintaining a same frequency resource allocation, a same transmit power, a same PA state, or a same spatial transmission relation (e.g., same antenna ports, same precoding), among other continuous or coherent configurations. By supporting joint channel estimation using bundled reference signals, such as DMRSs, and various capability and configuration signaling techniques for indicating physical channel transmissions in accordance with such bundling or phase continuity, a sidelink receiving device may estimate a channel between the sidelink receiving device and a sidelink transmitting device using an increased quantity of DMRSs, without such an increased quantity of DMRSs occupying a same sidelink TTI and displacing other communications of the sidelink TTI. A relatively higher quantity of DMRSs may support a relatively higher quality channel estimation, which may improve one or more aspects of sidelink communications, including more-reliably received or demodulated communications. Although the techniques herein are described with reference to DMRS and related bundling, it is to be understood that these techniques may apply to bundling of any reference signal in sidelink channels, such as a phase tracking reference signal (PTRS), a channel state information reference signal (CSI-RS), or a sounding reference signal (SRS), among other examples.

Aspects of the disclosure are initially described in the context of wireless communications systems, associated resource configurations and allocations, and signaling techniques. Aspects of the disclosure are further illustrated by and described with reference to apparatus diagrams, system diagrams, and flowcharts that relate to demodulation reference signal bundling for sidelink communications.

FIG. 1 illustrates an example of a wireless communications system 100 that supports demodulation reference signal bundling for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, physical transmissions of the wireless communications system 100 may be allocated to or scheduled to use communication resources of a TTI and, to support the reception or demodulation of a physical transmission by a receiving device, the physical transmission may include or be otherwise associated with one or more DMRSs. Such DMRSs may be measured by a receiving device for various channel estimation techniques, including techniques for normalizing or otherwise compensating for a signal propagation path between the receiving device and a transmitting device which may be used by the receiving device to demodulate data symbols carried on frequency resources of the physical transmission.

In accordance with examples as disclosed herein, devices of the wireless communications system 100 may be configured to support bundling of sidelink DMRSs (e.g., by a sidelink transmitting UE 115), which may support joint channel estimation (e.g., by a sidelink receiving UE 115) for a sidelink TTI that is based on measurement of DMRSs associated with multiple sidelink TTIs (e.g., including the sidelink TTI and one or more other sidelink TTIs). In some examples, such sidelink DMRS bundling may be supported by or enabled by performing sidelink physical channel transmissions in accordance with phase continuity between such transmissions, which may be associated with maintaining a same frequency resource allocation, a same transmit power, a same PA state, or a same spatial transmission relation (e.g., same antenna ports, same precoding), among other continuous or coherent configurations or combinations thereof. By supporting such joint channel estimation, and various capability and configuration signaling techniques for indicating physical channel transmissions in accordance with such bundling or phase continuity, a sidelink receiving UE 115 may estimate a channel between the sidelink receiving UE 115 and a sidelink transmitting UE 115 using an increased quantity of DMRSs, without such an increased quantity of DMRSs occupying a same sidelink TTI and displacing other communications of the sidelink TTI. A relatively higher quantity of DMRSs may support a relatively higher quality channel estimation, which may improve one or more aspects of sidelink communications, including more reliably received or demodulated sidelink communications.

Figure 2:
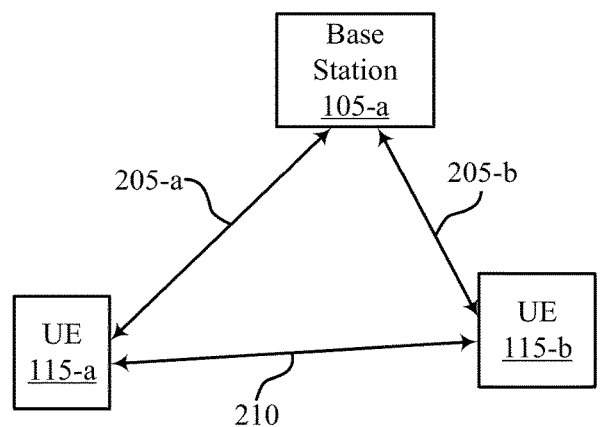
FIG. 2 illustrates an example of a wireless communications system that supports demodulation reference signal bundling for sidelink communications in accordance with aspects of the present disclosure.
Figure 2:
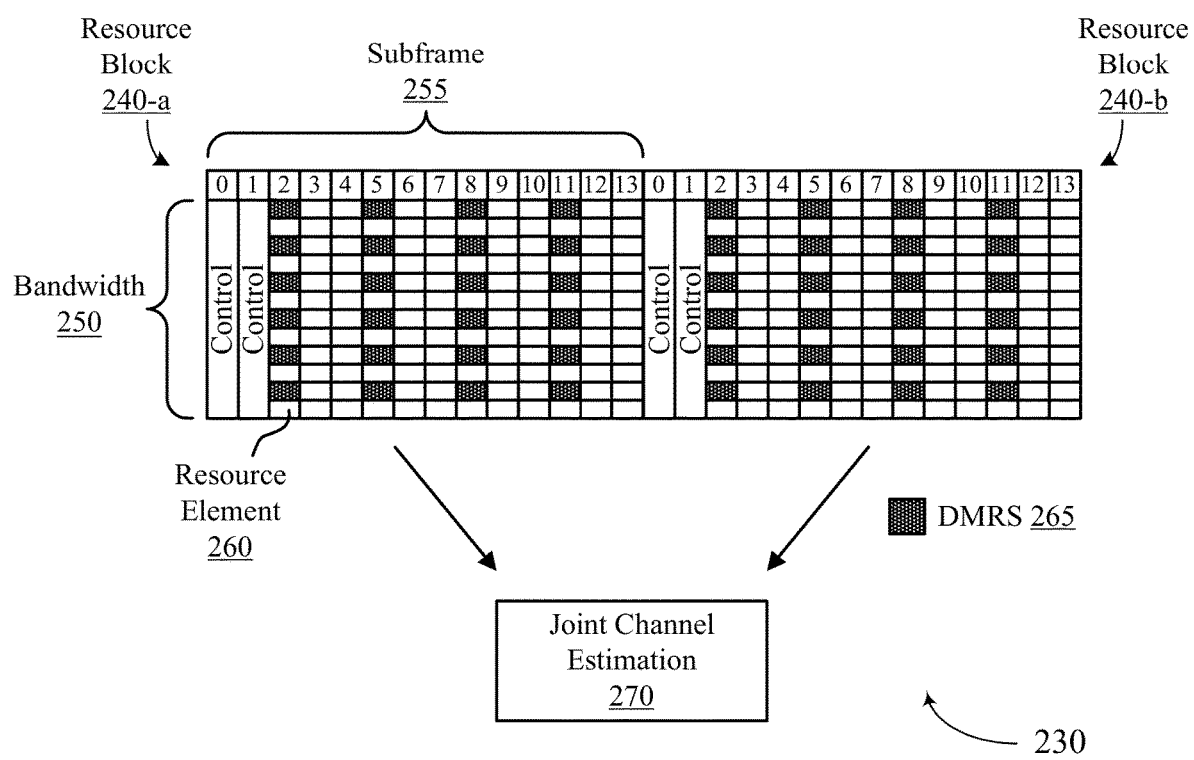

FIG. 2 illustrates an example of a wireless communications system 200 that supports demodulation reference signal bundling for sidelink communications in accordance with aspects of the present disclosure. In some examples, wireless communications system 200 may implement aspects of wireless communications system 100. The wireless communications system 200 may support various examples of uplink, downlink, and sidelink communications between a UE 115-*a*, a UE 115-*b*, and a base station 105-*a*, which may be examples of UEs 115 and base stations 105 as described with reference to FIG. 1.

The wireless communications system 200 may support sidelink communications, in which the UE 115-*a* and the UE 115-*b* may communicate directly without communications being routed via the base station 105-*a*. Such a sidelink may refer to or otherwise include a sidelink communication link 210 (e.g., a PC5 link, a PC5 interface) between the UE 115-*a* and the UE 115-*b*. In some cases, the resources for the sidelink communication between the UE 115-*a* and the UE 115-*b* may be allocated based on a mode configuration. In a first example, the UEs 115 may operate in accordance with a first mode (e.g., Mode 1) which may be a centralized mode in which resource allocations for sidelink communication are determined or scheduled by the base station 105-*a*. In a second example, the UEs 115 may operate in accordance with a second mode (e.g., Mode 2) which may be a distributed mode in which resource allocations are determined autonomously by a transmitting UE 115, and which may include various sensing and exclusion techniques to avoid or mitigate collision of communications from multiple UEs 115. In some examples, the UE 115-*a* and the UE 115-*b* may establish respective direct links with the base station 105-*a* via direct communication link 205-*a* and a direct communication link 205-*b* (e.g., a Uu link, a Uu interface), which may or may not support various aspects of the described techniques for DMRS bundling and phase continuity (e.g., phase coherence). In some examples, a modem of a UE 115 associated with a sidelink communication link 210 (e.g., a PC5 modem) may be different than a modem of the same UE 115 associated with a direct communication link 205 (e.g., a Uu modem).

In some examples, the wireless communications system 200 may be configured to support sidelink communications in accordance with the example of communications resources 230. The communications resources 230 may include various quantities of resource blocks 240 that each span a bandwidth 250 (e.g., a frequency carrier) in the frequency domain, and that each span a TTI (e.g., a subframe 255) in the time domain. In some examples, the resource blocks 240 may be an example of a smallest scheduled unit (e.g., as a TTI), but other scheduling units may be supported by the described techniques, such as TTIs scheduled in accordance with a slot granularity, with a mini-slot granularity, or with a symbol granularity, among other schedulable units. The resource blocks 240 may be subdivided into symbol durations (e.g., symbols), represented by a column of a resource block 240, in the time domain. The resource blocks 240 also may be subdivided into subcarriers, represented by a row of a resource block 240, in the frequency domain. In some examples, a resource consisting of a symbol duration in the time domain and a subcarrier in the frequency domain may be referred to as a resource element 260, and each resource element 260 may be associated with a signal waveform of a modulation symbol.

In some examples, a pattern of resource elements 260 of a resource block 240 may be allocated to DMRSs 265, which may support channel estimation techniques for decoding information-carrying modulation symbols of the resource block 240, among other purposes. In some examples, DMRSs 265 associated with a resource block 240 (e.g., within a subframe 255 of the same resource block 240, within a scheduling unit) may be measured to perform channel estimation techniques supporting a demodulating or decoding of the same resource block 240. However, in accordance with examples as disclosed herein, the wireless communications system 200 may support aspects of sidelink DMRS bundling, where DMRSs 265 from multiple TTIs (e.g., multiple resource blocks 240) may be measured in a joint channel estimation 270 that may support the demodulation or decoding of any one or more of the TTIs (e.g., any one or more of the resource blocks 240). In other words, the described techniques for sidelink DMRS bundling and joint channel estimation 270 may support demodulating or decoding sidelink physical channel transmissions of a given TTI using measurements of DMRSs 265 from multiple TTIs, which may improve sidelink channel estimation quality (e.g., improving an accuracy of reference parameters for demodulating or decoding sidelink physical channel transmissions). In some examples, such techniques may be supported by maintaining phase continuity or coherence across multiple sidelink TTIs (e.g., across multiple resource blocks 240, across multiple subframes 255, across multiple slots), which may involve maintaining a same frequency resource allocation, a same transmit power, a same PA state, or a same spatial transmission relation (e.g., same antenna ports, same precoding), among other continuous or coherent configurations or combinations thereof.

In some examples, maintaining phase continuity from one TTI to another, and bundling DMRSs 265 in accordance with the coherent phase, may improve the reliability of sidelink communications and, as such, may be beneficial for maintaining latency and reliability transmission criteria for expanding sidelink deployments such as V2X, IIOT, URLLC, or consumer use cases (e.g., XR, smart wearables), among other deployments, which may have a diverse set of latency requirements or reliability requirements. For example, some sidelink deployments may be associated with strict latency requirements (e.g., less than 1 ms) while reliability is relaxed, whereas some other sidelink deployments may be associated with stringent reliability requirements (e.g., a block error rate (BLER) less than $10^{-6}$) while the latency is relaxed. For some sidelink deployments, both latency and reliability requirements may be relatively high (e.g., latency less than 1 ms and BLER less than $10^{-6}$). In some examples, such sidelink communications may be supported by one or more aspects of the described techniques for phase continuity, DMRS bundling, and joint channel estimation, including techniques for wireless devices to effectively indicate the ability to perform phase continuity or joint channel estimation on sidelink physical channels such as a physical sidelink shared channel (PSSCH), a physical sidelink control channel (PSCCH), or a physical sidelink feedback channel (PSFCH).

By implementing various techniques in accordance with examples as disclosed herein, a UE 115 may perform DMRS bundling and phase continuity across multiple sidelink physical channel transmissions (e.g., PSSCH, PSCCH, and PSCCH). In some examples, a UE 115 may indicate the ability to perform phase continuity or DMRS bundling for physical sidelink channels, including such indications on a per-RP basis (e.g., in accordance with a process identifier). A UE 115 also may indicate whether it is able to maintain phase continuity when switching between transmitting different physical sidelink channels on different resource pools (RPs). In some examples, a UE 115-a also may indicate a quantity of symbol durations involved in reloading a power and phase configuration for DMRS bundling. When performing such sidelink physical channel transmission, a UE 115 performing sidelink communications may use sidelink control information (SCI) (e.g., SCI-1 or SCI-2) to indicate or identify if various physical sidelink channels are DMRS bundled, or to indicate or identify an initiation and a duration of DMRS bundling. When applied to feedback transmissions, a UE 115 may choose to drop a PSFCH or switch to a negative-acknowledgment (NACK)-only feedback for cases in which the UE 115 would be unable to maintain phase continuity when switching between transmitting different physical sidelink channels on different RPs.

Figure 3A:
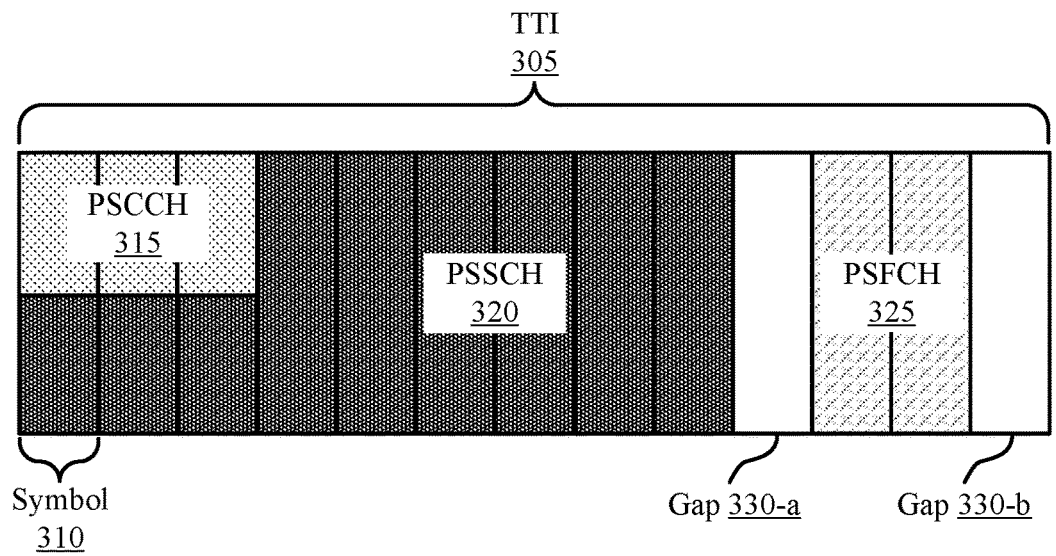
FIG. 3A illustrates an example of a physical channel configuration that supports demodulation reference signal bundling for sidelink communications in accordance with aspects of the present disclosure.

FIG. 3A illustrates an example of a physical channel configuration 300 that supports demodulation reference signal bundling for sidelink communications in accordance with aspects of the present disclosure. In some examples, the physical channel configuration 300 may implement aspects of the wireless communications system 100 or the wireless communications system 200. The physical channel configuration 300 may support various examples of sidelink communications between a transmitting wireless device and a receiving wireless device (e.g., between a UE 115-a and a UE 115-b as described with reference to FIG. 2).

The physical channel configuration 300 illustrates an allocation of resources (e.g., resources in the time domain and the frequency domain) that may be configured for a sidelink transmission and, in accordance with examples as disclosed herein, may support one or more aspects of phase continuity, DMRS bundling, and joint channel estimation. In the example of physical channel configuration 300, the TTI 305 may be an example of a subframe (e.g., of a resource block, such as a subframe 255 associated with a resource block 240 described with reference to FIG. 2), but the techniques described herein may be performed with various configurations of a TTI, including a slot TTI, a mini-slot TTI, or other TTI configurations (e.g., other granularity for scheduling among UEs 115). The TTI 305 may be divided into a quantity of one or more symbols 310. The example of TTI 305 is illustrated with 13 symbols 310; however, in some other cases the TTI may have a different quantity of one or more symbols 310 (e.g., 14 symbols 310). The physical channel configuration 300 illustrates three physical sidelink channels that may be distributed in a sidelink resource allocation, including a PSCCH 315, a PSSCH 320, and a PSFCH 325, but the described techniques may be implemented with distributions of any set of one or more physical channels in a TTI 305. Each of the physical channels of the physical channel configuration 300 may be associated with a respective frequency resource, which may refer to a carrier, to a set of one or more subcarriers, or to an RP, or a portion thereof.

In some examples, the PSCCH 315 may carry control information associated with a transmitting UE 115 or one or more aspects of the physical channel configuration 300, which may include control information intended for a receiving UE 115. For example, SCI (e.g., SCI-1) may be transmitted via the PSCCH 315, and may include information corresponding to data transmitted during the TTI 305 (e.g., data priority, data resource assignment, a resource reservation period, etc.). In some examples (e.g., as illustrated), a PSCCH may occupy a subset of frequency resources allocated to the physical channel configuration 300 (e.g., a subset of subcarriers corresponding to a carrier associated with the physical channel configuration 300). In some examples, a PSSCH 320 may carry sidelink data intended for a receiving UE 115, which may be associated with the control information conveyed in the PSCCH 315. In some examples (e.g., as illustrated), at least a portion of a PSSCH 320 may occupy a subset of resources allocated to the physical channel configuration 300.

In some examples, the PSFCH 325 may be associated with feedback operations, such as providing channel information or HARQ feedback responsive to an earlier (e.g., received) transmission, and may support one or more bits of feedback information such as bundled HARQ-ACK bits and channel state information (CSI) feedback. In various examples, a PSFCH 325 may or may not be configured with resource elements allocated to DMRSs, such that a PSFCH 325 may implement various techniques for phase continuity and joint channel estimation. In some examples, one or more symbols 310 of the TTI 305 may be configured as a gap 330, which may provide a gap duration between physical channel transmissions. In some examples, such a gap duration may support aspects of signal processing or modem reconfiguration, such as loading a PA configuration (e.g., loading a transmit power or phase configuration). Although the physical channel configuration 300-a is illustrated with a PSFCH 325, in some examples, a PSFCH 325 may be omitted from a physical channel configuration 300, which may or may not be associated with fewer gaps 330 (e.g., omitting gap 330-a in a physical channel configuration 300 that omits the PSFCH 325).

In some cases, a UE 115 may transmit successive physical channel transmissions in accordance with the physical channel configuration 300, and the transmitting UE 115 may implement techniques for phase continuity or phase coherency from one physical channel transmission to another. For example, a transmitting UE 115 may maintain phase continuity from a PSCCH 315 (e.g., an SCI-1) of a first instance of the physical channel configuration 300 to a PSCCH 315 of a following instance of the physical channel configuration 300, or maintain phase continuity from a PSSCH 320 of a first instance of the physical channel configuration 300 to a PSSCH 320 of a following instance of the physical channel configuration 300, or maintain phase continuity from a PSFCH 325 of a first instance of the physical channel configuration 300 to a PSFCH 325 of a following instance of the physical channel configuration 300 (e.g., in examples where a PSFCH includes or is otherwise associated with DMRSs), or any combination of these.

As supported by various examples of capability and configuration signaling described herein, the transmitting UE 115 may indicate such phase continuity to a receiving UE 115, such as an indication of DMRS bundling, which may support the receiving UE 115 performing a joint channel estimation between the instances of the physical channel configuration 300 transmitted via the sidelink communication link. In some examples, a transmitting UE 115 or a receiving UE 115 may utilize DMRS bundling for each physical channel type across a set of transmissions, which may be associated with various configurations of the respective transmissions.

Figure 3B:
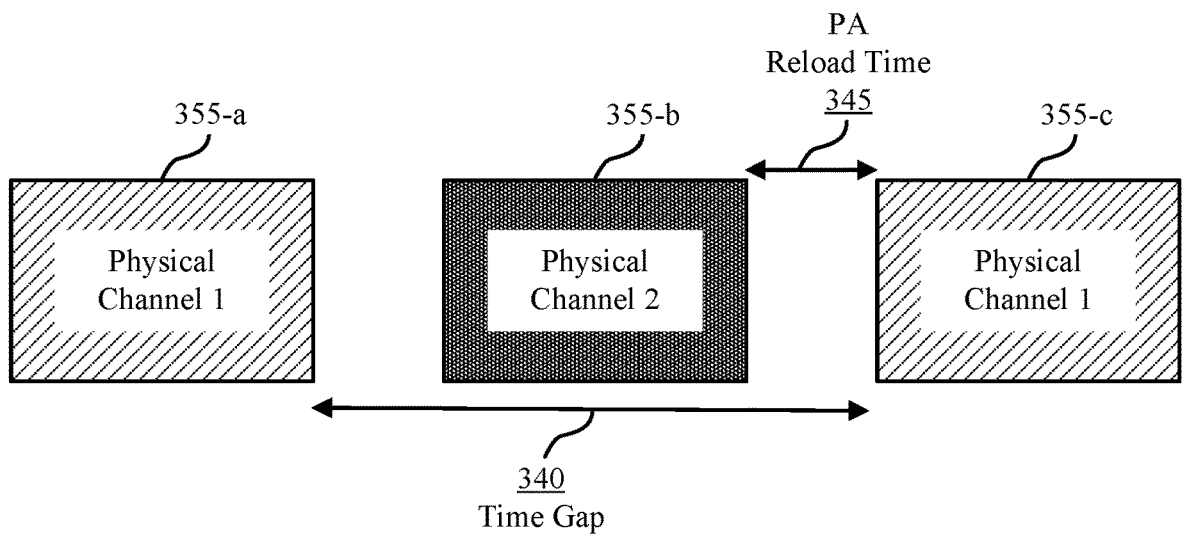
FIG. 3B illustrates an example of a sidelink transmission timeline that supports demodulation reference signal bundling for sidelink communications in accordance with aspects of the present disclosure.

FIG. 3B illustrates an example of a sidelink transmission timeline 350 that supports demodulation reference signal bundling for sidelink communications in accordance with aspects of the present disclosure. In some examples, the sidelink transmission timeline 350 may implement aspects of wireless communications system 100 or the wireless communications system 200, and also may support physical channel transmissions in accordance with the physical channel configuration 300 described with reference to FIG. 3A.

The sidelink transmission timeline 350 illustrates a sequence of physical channel transmissions 355, where each physical channel transmission 355 may be associated with a TTI (e.g., a duration of one or more symbols, a slot, a mini-slot, a subframe) and a frequency resource (e.g., an RP). In some examples, a first wireless device (e.g., a transmitting UE 115) may establish a sidelink communication with a second wireless device (e.g., a receiving UE 115), and may proceed to transmit multiple physical channel transmissions 355. The transmitting UE 115 may bundle DMRSs among multiple physical channel transmissions 355, which may be associated with maintaining a same frequency resource allocation, a same transmit power, a same power amplifier (PA) state, or a same spatial transmission relation (e.g., same antenna ports, same precoding), among other continuous or coherent configurations, between instances of physical channel transmissions 355 having phase continuity or bundled DMRSs.

In some examples, a transmitting UE 115 may indicate to the receiving UE 115 a capability or configuration to maintain phase continuity (e.g., phase coherency) among the multiple physical channel transmissions 355. In some examples, such an indication may include an indication of whether the transmitting UE 115 is capable of maintaining phase continuity when a physical channel is transmitted on other RPs, or a duration (e.g., a minimum duration, a required duration) associated with reloading a PA configuration (e.g., a power configuration, a phase configuration) associated with the maintained phase continuity between physical channel transmissions 355, or both.

In some implementations of the sidelink transmission timeline 350, phase continuity, DMRS bundling, and joint channel estimation may be supported between transmissions of a same type of physical channel. For example, the physical channel transmissions 355-a and 355-c may share a common sidelink channel type (e.g., a PSCCH, a PSSCH, a PSFCH), and may be associated with a same frequency resource (e.g., a first RP). Accordingly, the physical channel transmissions 355-a and 355-c may be associated with bundled DMRSs, which may support joint channel estimation associated with demodulating or decoding the physical channel transmissions 355-a and 355-c, despite being associated with different TTIs (e.g., different scheduling units or allocations).

In some examples, a configuration that supports phase continuity and DMRS bundling between the physical channel transmissions 355-a and 355-c may be associated with a time gap 340, representing a time between the bundled physical channel transmissions 355-a and 355-c. Although illustrated as a time between an end of the first physical channel transmission and a start of the second physical channel transmission, a configuration for phase continuity or DMRS bundling may alternatively be associated with a periodicity (e.g., a time between a start of a first physical channel transmission and a start of a subsequent physical channel transmission). In some examples, a UE 115 may support sidelink phase continuity or DMRS bundling when a time gap 340 is less than or equal to a configured, indicated, or threshold duration (e.g., a threshold quantity of symbol durations), and after such a duration phase continuity or DMRS bundling may not be maintained. In some examples, such a time gap 340 may be specific to a specific type of physical channel or resource pool, and different physical channels or resource pools may be associated with a same or different value for such a time gap 340.

In some examples, a configuration that supports phase continuity and DMRS bundling between the physical channel transmissions 355-a and 355-c may be associated with PA reload time 345, representing a time between an intervening physical channel transmission 355 (e.g., physical channel transmission 355-b) and a bundled physical channel transmission 355 (e.g., physical channel transmission 355-c). The PA reload time may be associated with a duration to modify a power or phase configuration (e.g., at a modem of a transmitting UE 115), which may be required when transitioning between power configurations, or transitioning between frequency resources (e.g., between RPs), or both. For example, the physical channel transmissions 355-a and 355-c may be associated with a first RP, RP1, and the physical channel transmission 355-b may be associated with a different RP, RP2. Because a transmitting UE 115 may need to load a different transmission configuration between the end of the physical channel transmission 355-*b* and the beginning of the physical channel transmission 355-*c*, maintaining phase continuity or DMRS bundling may accordingly involve a period without transmission, which may be associated with the PA reload time 345. If a duration between un-bundled physical channel transmissions 355 (e.g., physical channel transmissions having a different type or configuration, or occupying different frequency resources) is shorter than the PA reload time 345, phase continuity or DMRS bundling may not be maintained by a transmitting UE 115. In some examples, such a reload time may be supported by a gap between physical channel transmissions, such as a gap duration within a TTI (e.g., gap 330-*a* of the physical channel configuration 300) or at the edge of a TTI (e.g., gap 330-*b* of the physical channel configuration 300). In various examples, such a PA reload time 345 may be indicated in a capability indication, configured during a sidelink communication link establishment, or pre-configured at a UE 115, among other examples.

In some examples, when a UE 115 transmits physical sidelink channels using multiple RPs during an ongoing DMRS bundling, the transmitting UE 115 may indicate (e.g., via radio resource control (RRC) signaling) to a receiving UE 115 whether it is able to maintain phase continuity. In cases in which the transmitting UE 115 is able to maintain phase continuity, it may also indicate (e.g., via RRC signaling) a quantity of symbols (e.g., a minimum quantity of symbols, a configured quantity of symbols) to reload the power and phase configuration for a DMRS bundle (e.g., indicating a PA reload time 345). In some cases, such an indication may be on a per-RP basis. In some examples, a base station 105 or other network entity may configure some RPs to be associated with phase continuity or joint channel estimation techniques, such that UEs 115 may assume certain aspects of a DMRS or phase continuity configuration.

In some examples, a transmitting UE 115 may indicate (e.g., via RRC signaling) a duration (e.g., a maximum duration, a configured duration) over which the transmitting UE 115 may be capable of maintaining phase continuity between physical channel transmissions 355. For example, if a time gap 340 between the physical channel transmission 355-*a* and the physical channel transmission 355-*c* is greater than a threshold (e.g., a defined number of OFDM symbols between the two physical channel transmissions 355), the transmitting UE 115 may not be configured for or capable of maintaining phase continuity. A receiving UE 115 may use an indication of such a threshold to evaluate whether a transmitting UE 115 has transmitted physical channel transmissions with phase continuity (e.g., based on the duration of a time gap 340 between physical channel transmissions). In some examples, a transmitting UE 115 may indicate (e.g., via RRC signaling) to a receiving UE 115 if it is able to maintain phase continuity while switching between RPs and, if so, may indicate a quantity of symbols (e.g., a minimum quantity of symbols, a configured quantity of symbols) to reload the power and phase configuration for the ongoing DMRS bundling (e.g., the PA reload time 345).

In some examples, a configuration for feedback operations may be associated with one or more aspects of phase continuity of DMRS bundling. For example, if a physical channel transmission 355-*b* is associated with a PSFCH (e.g., for transmitting acknowledgment feedback of CSI), a transmitting UE 115 may evaluate how to perform feedback operations based on a phase continuity of DMRS bundling configuration associated with the physical channel transmissions 355-*a* and 355-*b*. For example, if a gap between the physical channel transmissions 355-*b* and the physical channel transmissions 355-*c* is less than the PA reload time 345, which may be associated with an inability to maintain phase continuity between the physical channel transmissions 355-*a* and 355-*c*, a UE 115 may determine whether to proceed with or drop a feedback transmission associated with a PSFCH transmission of the physical channel transmission 355-*b*. In some examples, such feedback may be associated with a relatively low priority (e.g., lower than a priority associated with maintaining phase continuity between the physical channel transmissions 355-*a* and 355-*c*), and the UE 115 may determine to drop or cancel the physical channel transmission 355-*b* (e.g., dropping or omitting transmissions of a PSFCH). In some examples under such circumstances, a transmitting UE 115 may determine to process feedback in accordance with a NACK-only configuration (e.g., dropping the physical channel transmission 355-*b* when a PSFCH is associated with an ACK transmission, proceeding with the physical channel transmission 355-*b* when a PSFCH is associated with a NACK transmission). In accordance with these and other considerations for feedback and other physical channel transmissions, a UE 115 may evaluate or otherwise consider transmission priorities when performing physical channel transmissions 355 in accordance with phase continuity or DMRS bundling configurations. In some examples, a UE 115 receiving such feedback (e.g., over a PSFCH) may assume that the feedback is transmitted in accordance with a phase continuity configuration if the transmission being responded to was also transmitted in accordance with the phase continuity configuration.

Figure 4:
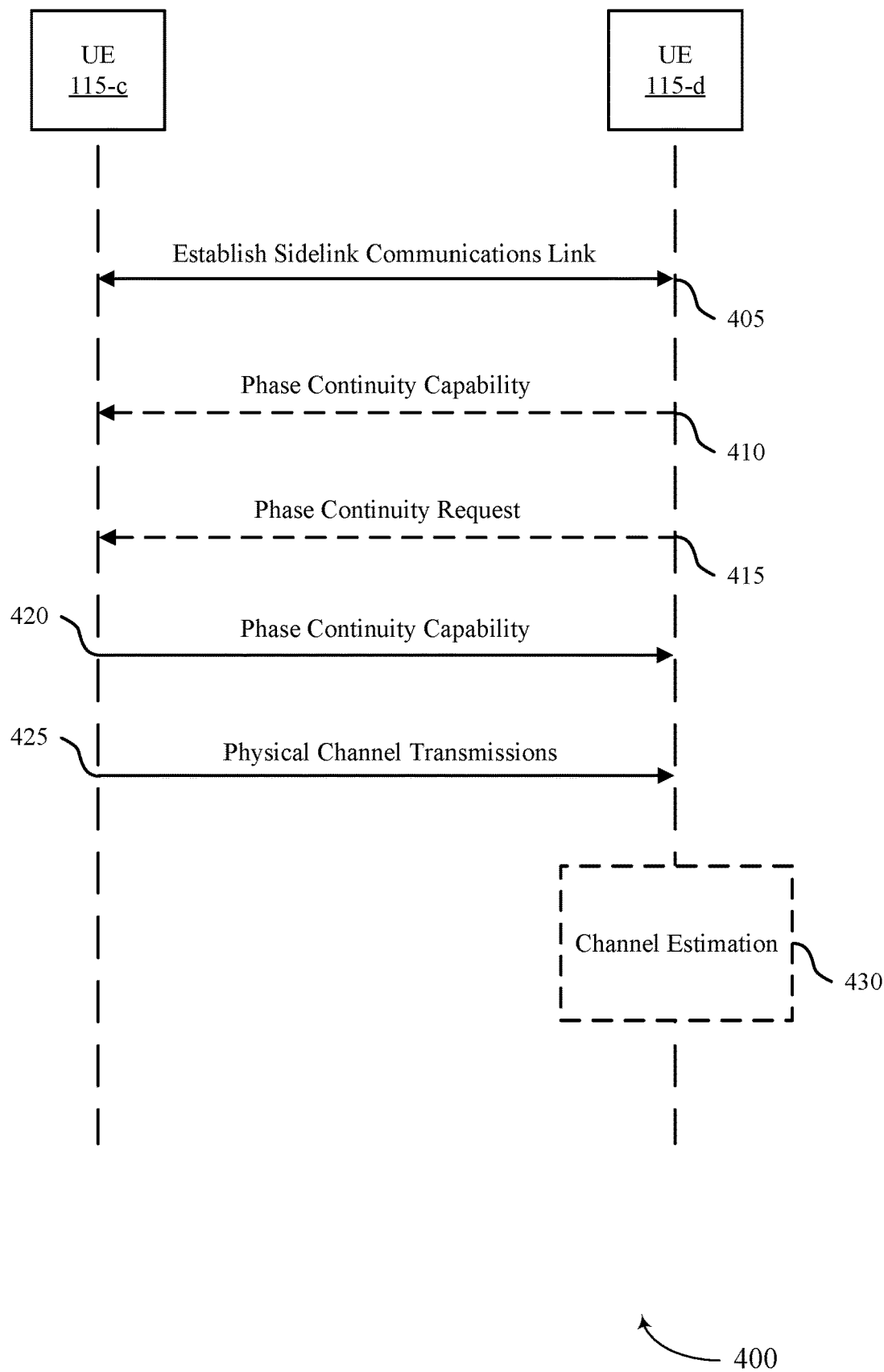
FIG. 4 illustrates an example of a process flow that supports demodulation reference signal bundling for sidelink communications in accordance with aspects of the present disclosure.

FIG. 4 illustrates an example of a process flow 400 that supports demodulation reference signal bundling for sidelink communications in accordance with aspects of the present disclosure. In some examples, the process flow 400 may implement aspects of the wireless communications systems 100, the wireless communications systems 200, the physical channel configuration 300, the sidelink transmission timeline 350, or a combination thereof. The process flow 400 may support DMRS bundling and phase continuity between physical channel transmissions for sidelink communication between the UE 115-*c* (e.g., a transmitting UE 115) and a UE 115-*d* (e.g., a receiving UE). The UE 115-*c* and the UE 115-*d* may be examples of devices described with reference to FIGS. 1 and 2.

At 405, the UE 115-*c* and the UE 115-*d* may establish a sidelink communication link, such as a sidelink communication link 210 described with reference to FIG. 2 (e.g., a PC5 link). In various examples, the establishment of the sidelink communication link at 405 may include various physical layer signaling or protocol layer signaling, such as RRC configuration parameters, MAC control signaling, among other control or configuration signaling that may support one or more aspects of the described techniques. In some examples, signaling associated with the sidelink communications link establishment of 405, or other configuration signaling, may include an indication of a duration for activating a configuration for phase continuity between physical channel transmissions, which may be conveyed using RRC signaling of MAC signaling.

In some examples, at 410, the UE 115-*d* may transmit an indication of a capability of the UE 115-*d* to support a configuration for phase continuity between physical channel transmissions associated with the sidelink communications link, which may be received by the UE 115-*c*. Such a capability indication may indicate that the UE 115-*d* is capable of performing one or more joint channel estimation techniques that may be supported by a configuration for bundled sidelink DMRSs. In some examples, the indication of 410 may be evaluated by the UE 115-*c* to determine whether or not to perform physical channel transmissions to the UE 115-*d* in accordance with a configuration for phase continuity between physical channel transmissions. In some examples, the indication of 410 may be signaled using RRC signaling (e.g., PC5 RRC signaling) or a MAC-CE. Although illustrated as a separate operation, in some examples, such an indication may be signaled during the sidelink communication link establishment of 405, or of a reconfiguration of the established sidelink communications link.

In some examples, at 415, the UE 115-*d* may transmit a phase continuity request (e.g., a request to perform transmissions in accordance with a configuration for phase continuity), which may be received by the UE 115-*c*. For example, the UE 115-*d* may request that the UE 115-*c* bundle sidelink DMRSs associated with multiple PSFCHs across multiple sidelink transmissions. In some examples, such a request may indicate that the UE 115-*d* would prefer to perform one or more joint channel estimation techniques that may be supported by a configuration for bundled sidelink DMRSs, which may be associated with a priority of communicated information or operations associated with communicated information. In some examples, the request of 415 may be evaluated by the UE 115-*c* to determine whether or not to perform physical channel transmissions to the UE 115-*d* in accordance with a configuration for phase continuity or DMRS bundling between physical channel transmissions. Such a request may be conveyed to the UE 115-*c* using an instance of SCI (e.g., SCI-1 or SCI-2).

At 420, the UE 115-*c* may transmit an indication of a capability of the UE 115-*c* to support a configuration for phase continuity between physical channel transmissions of the sidelink communications link. In some examples, the capability transmission of 420 may include a respective capability indication for each physical channel of a set of one or more physical channels, for each RP of a set of one or more RPs, or for a combination thereof. For example, the configuration for phase continuity between physical channel transmissions may be associated with maintaining phase continuity between PSCCH transmissions, between PSSCH transmissions, between PSFCH transmissions, or a combination thereof, which may be further defined on a per-RP basis. As such, the UE 115-*c* may perform multiple phase continuity processes, in which case a quantity of processes may be defined (e.g., a maximum quantity of processes, a configured quantity of processes). For example, a process may be defined for each sidelink physical channel to maintain phase continuity or DMRS bundling, and in some examples each RP may be defined as a process. In some cases, each physical channel or sets of physical channels within an RP may be associated with a coherency process ID. In some cases, the UE 115-*c* may indicate its ability to perform DMRS bundling for a window of time (e.g., one or more TTIs, one or more slots or mini slots, one or more symbols, etc.). In some cases, the UE 115-*c* may indicate whether it is able to maintain phase continuity on a PSFCH when a physical channel (e.g., another PSFCH, a PSSCH) is transmitted on other RPs and, if so, a quantity of symbols associated with the UE 115-*c* reloading a power or phase configuration (e.g., a PA reload duration) for ongoing DMRS bundling which, in some examples may be leveraged by the UE 115-*d* for understanding a feedback configuration. In some examples, the capability indication of 420 may be transmitted in response to a capability of the UE 115-*d* (e.g., as part of the communications link establishment of 405 or the capability indication of 410), or a request from the UE 115-*d* (e.g., a phase continuity request of 415)

At 425, the UE 115-*c* may transmit one or more physical channel transmissions to the UE 115-*d* in accordance with the indicated configuration for phase continuity between physical channel transmissions of the sidelink communications link (e.g., based at least in part on the capability indication of 420). In some examples, the physical channel transmissions of 425 may be performed in accordance with the configuration for phase continuity based on an indicated capability of the UE 115-*d* (e.g., as part of the communications link establishment of 405 or the capability indication of 410), or a request from the UE 115-*d* (e.g., a phase continuity request of 415).

In some examples, the one or more physical channel transmissions may occur over one or more TTIs (e.g., a set of one or more scheduling units). For example, the UE 115-*c* may transmit, during a first TTI, a first physical channel transmission over the sidelink communications link and transmit, during a second TTI, a second physical channel transmission over the sidelink communications link such that the first physical channel transmission is associated with a first set of one or more DMRSs and the second physical channel transmission is associated with a second set of one or more DMRSs. In some examples, the first set of DMRSs and the second set of DMRSs may be configured for joint channel estimation performed by the UE 115-*d*. In some examples, during either the first TTI or the second TTI, the UE 115-*c* may transmit an indication that the first set of DMRSs and the second set of DMRSs are configured for the joint channel estimation. In some examples, to support the DMRS bundling or phase continuity, the first physical channel transmission and the second physical channel transmission may be transmitted with a same resource in the frequency domain, with a same transmission power, with a same resource in the spatial domain, with a same antenna port, or with a same precoding, or any combination thereof.

In some cases, the physical channels transmitted during the first TTI and the second TTI may be PSFCH transmissions. In such examples, the UE 115-*c* may transmit a two stage PSFCH. For instance, in the first stage, the UE 115-*c* may send a 1-bit transmission that may indicate whether the current PSFCH is DMRS bundled to other PSFCH transmissions, and if so, whether the current PSFCH is bundled to a previous PSFCH or a following PSFCH. The two stages may take place across two resource blocks on the same PSFCH OFDM symbols, or across two OFDM symbols on a same slot in cases in which there are more than two OFDM symbols per PSFCH.

In some cases, the physical channels transmitted during the first TTI and the second TTI may be PSSCH transmissions. In such cases, each PSCCH may include SCI to indicate whether the current PSSCH DMRS is bundled, and if so, the SCI may indicate whether the current PSSCH is bundled with a previous or future PSSCH. The SCI may either be SCI-1 or SCI-2, and the UE 115-*d* may leverage the information provided in the SCI to determine which sets of PSSCH transmissions to use for joint channel estimation.

In some cases, the UE 115-*c* may transmit, before the first TTI, RRC signaling or MAC signaling that indicates to the UE 115-*d* a duration for activating the configuration for phase continuity between physical channel transmissions of the sidelink communications link, and the first TTI and the second TTI may occur within the duration indicated by the UE 115-*c*. In some examples, the UE 115-*c* may use a MAC-CE or RRC signaling to indicate to the UE 115-*d* to start a bundling window. Additionally, or alternatively, the process may be indicated or configured by MAC-CE or RRC signaling and a trigger from an SCI-2 may be transmitted by the UE 115-c to start the channel estimation across a set of physical channel transmissions. For example, MAC-CE or RRC signaling may configure a parameter for the number of physical channel occasions, and configure a trigger in SCI-2 that may be used to start the occasion bundle.

In some examples, the configuration for joint channel estimation may be based on a duration between the first TTI and the second TTI being less than or equal to a threshold. For example, the UE 115-c may indicate whether it is able to maintain phase continuity when a channel is transmitted on other RPs, and if so, the minimum number of symbols (e.g., the threshold) for the UE 115-c to reload the power and phase configuration for the ongoing DMRS bundling. In some examples of PSFCH DMRS bundling, the transmission periodicity may occur every slot (e.g., a duration of 14 symbols) which may be greater than a threshold duration in which the UE 115-c may be able to maintain phase continuity. As such, in cases in which the UE 115-c refrains from transmitting an explicit indication of phase continuity, the UE 115-d may assume there is no phase continuity or DMRS bundling when the periodicity is greater than the threshold indicated by the UE 115-c.

In some examples, the physical channel transmissions of 425 may be performed in accordance with the indicated configuration for phase continuity based on a priority or a QoS associated with the one or more physical channel transmissions. For example, there may be an association between the priority or QoS of the physical channel transmission and the activation of phase continuity. That is, the transmissions across all high priority transmissions may be performed in accordance with DMRS bundling (e.g., within an activated window indicated by MAC-CE or RRC signaling). The QoS value associated with a transmission may be included in a PSCCH transmission as part of SCI-1 content. Additional SCI-1 content may include a PSSCH resource assignment (e.g., frequency and time resources for the PSSCH), a resource reservation period, a PSSCH DMRS pattern (if more than one pattern is configured), a second SCI format (e.g., information on the size of a second SCI), a 2-bit offset of a second stage control resource allocation, the number of PSSCH DMRS ports (e.g., 1 or 2), and a 5-bit MCS, among other indications.

In some examples, the physical channel transmissions of 425 may be transmitted using a RP associated with the established sidelink communications link, which may be allocated to sidelink transmissions performed with DMRS bundling. For instance, a base station 105 may configure some RPs to have phase continuity and the UE 115-d may expect phase continuity from any sidelink channel using this RP. The UE 115-c may also expect phase continuity for PSFCH transmissions from the UE 115-d for cases in which the UE 115-d transmits feedback information to the UE 115-c. In some cases, based on the capability of UE 115-c, the UE 115-c may be configured per RP to maintain phase continuity between one or more physical channel transmissions. In some examples, the UE 115-c may transmit the physical channel transmissions using a first modem, associated with the sidelink communications link, that is different than a second modem associated with communications between the UE 115-c and the base station 105. In some cases, the first modem and the second modem may have different PA qualities, and the two modems may accordingly have different thresholds after which the UE 115-c may be unable to maintain phase continuity (e.g., a quantity of OFDM symbols between two physical channel transmissions).

In some examples, one or more aspects of a feedback configuration may be associated with the transmission of the physical channels at 425. For example, prior to the physical channel transmissions of 425, the UE 115-d may transmit one or more physical channel transmissions to the UE 115-c (e.g., one or more PSSCHs, one or more PSCCHs), which may be associated with responsive feedback from the UE 115-c. In some examples, the UE 115-c may determine a configuration for providing feedback to such transmissions from the UE 115-d based on the physical channel transmissions of 425 and an associated configuration for phase continuity or DMRS bundling. For example, the UE 115-c may perform feedback operations in accordance with a NACK-only feedback configuration, or may refrain from transmitting feedback, based on an RP associated with the feedback or an RP associated with the physical channel transmissions of 425, or a duration between a feedback physical channel and a physical channel of the physical channel transmissions of 425, or both. For example, the UE 115-c may switch to NACK-only feedback, or may drop a feedback transmission (e.g., a low-priority feedback transmission) in the event that such feedback transmissions would interfere with or prevent supporting one or more aspects of DMRS bundling or phase continuity on another physical channel (e.g., if not enough time is provided for reloading a PA configuration to maintain phase continuity).

At 430, the UE 115-d may perform a channel estimation procedure based at least in part on the configuration for phase continuity. For example, the UE 115-d may measure sidelink DMRSs from multiple TTIs of the physical channel transmissions of 425 (e.g., bundled DMRSs), and may estimate channel metrics for a given sidelink TTI of the physical channel transmissions of 425 using the measured sidelink DMRSs from the multiple TTIs. In some examples, such techniques may include determining one or more channel or signal propagation parameters associated with a first physical channel transmission, or a second physical channel transmission, or both based on a joint channel estimation associated with a first set of DMRSs and a second set DMRSs. Using the determined phase, the UE 115-d may demodulate or decode the physical channels transmitted at 425 (e.g., decode a PSCCH, decode a PSSCH, decode a PSFCH), among other operations.

Figure 5:
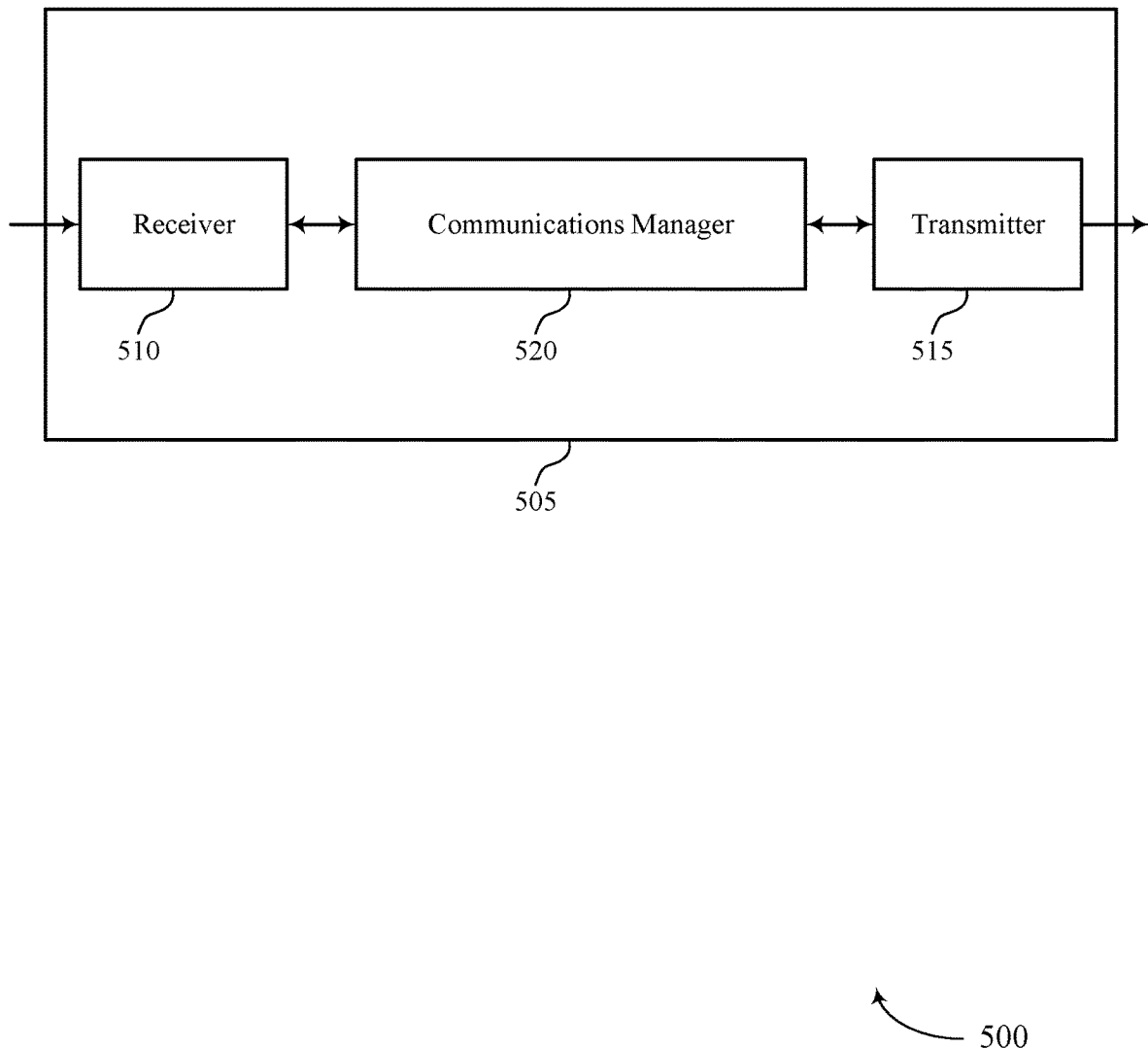
FIGS. 5 through 7 show block diagrams of devices that support demodulation reference signal bundling for sidelink communications in accordance with aspects of the present disclosure.

FIG. 5 shows a block diagram 500 of a device 505 that supports demodulation reference signal bundling for sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to demodulation reference signal bundling for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to demodulation reference signal bundling for sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of demodulation reference signal bundling for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support physical channel transmission in accordance with examples as disclosed herein. For example, the communications manager 520 may be configured as or otherwise support a means for establishing (e.g., at a first wireless device) a sidelink communications link with a second wireless device. The communications manager 520 may be configured as or otherwise support a means for transmitting, to the second wireless device, an indication of a capability of the first wireless device to support a configuration for phase continuity between physical channel transmissions of the sidelink communications link. The communications manager 520 may be configured as or otherwise support a means for transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

Additionally or alternatively, the communications manager 520 may support physical channel reception in accordance with examples as disclosed herein. For example, the communications manager 520 may be configured as or otherwise support a means for establishing (e.g., at a first wireless device) a sidelink communications link with a second wireless device. The communications manager 520 may be configured as or otherwise support a means for receiving, from the second wireless device, an indication of a capability of the second wireless device to support a configuration for phase continuity between physical channel transmissions of the sidelink communications link. The communications manager 520 may be configured as or otherwise support a means for receiving, by the first wireless device and based on receiving the indication of the capability of the first wireless device, one or more physical channel transmissions from the second wireless device in accordance with the indicated configuration for phase continuity between physical channel transmissions of the sidelink communications link.

By including or configuring the communications manager 520 in accordance with examples as described herein, the device 505 may support sidelink transmission techniques for maintaining phase continuity between physical channel transmissions, or bundling DMRS transmissions, or sidelink reception techniques for performing joint channel estimation across sidelink physical channel transmissions. In various examples, such techniques may provide a greater quantity of DMRSs for channel estimation such as phase determination, without occupying communication resources of a given sidelink TTI, which may support efficient processes for improving sidelink communications reliability and resource utilization. Such techniques may be particularly valuable to sidelink communications relying on high reliability, low latency, or both.

Figure 6:
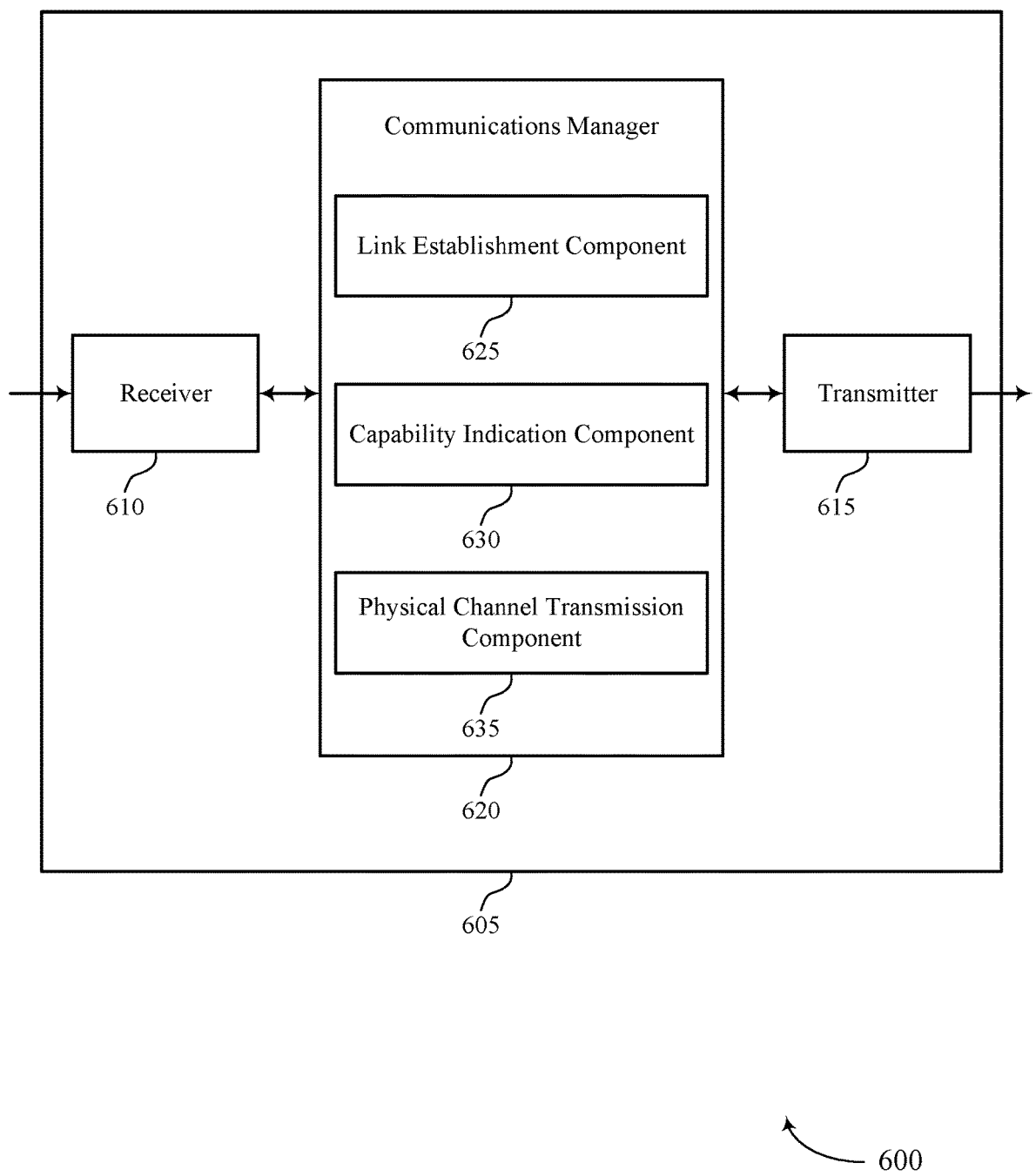

FIG. 6 shows a block diagram 600 of a device 605 that supports demodulation reference signal bundling for sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to demodulation reference signal bundling for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to demodulation reference signal bundling for sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of demodulation reference signal bundling for sidelink communications as described herein. For example, the communications manager 620 may include a link establishment component 625, a capability indication component 630, or a physical channel transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The link establishment component 625 may be configured as or otherwise support a means for establishing, at a first wireless device, a sidelink communications link with a second wireless device. The capability indication component 630 may be configured as or otherwise support a means for transmitting, to the second wireless device, an indication of a capability of the first wireless device to support a configuration for phase continuity between physical channel transmissions of the sidelink communications link. The physical channel transmission component 635 may be configured as or otherwise support a means for transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

Figure 7:
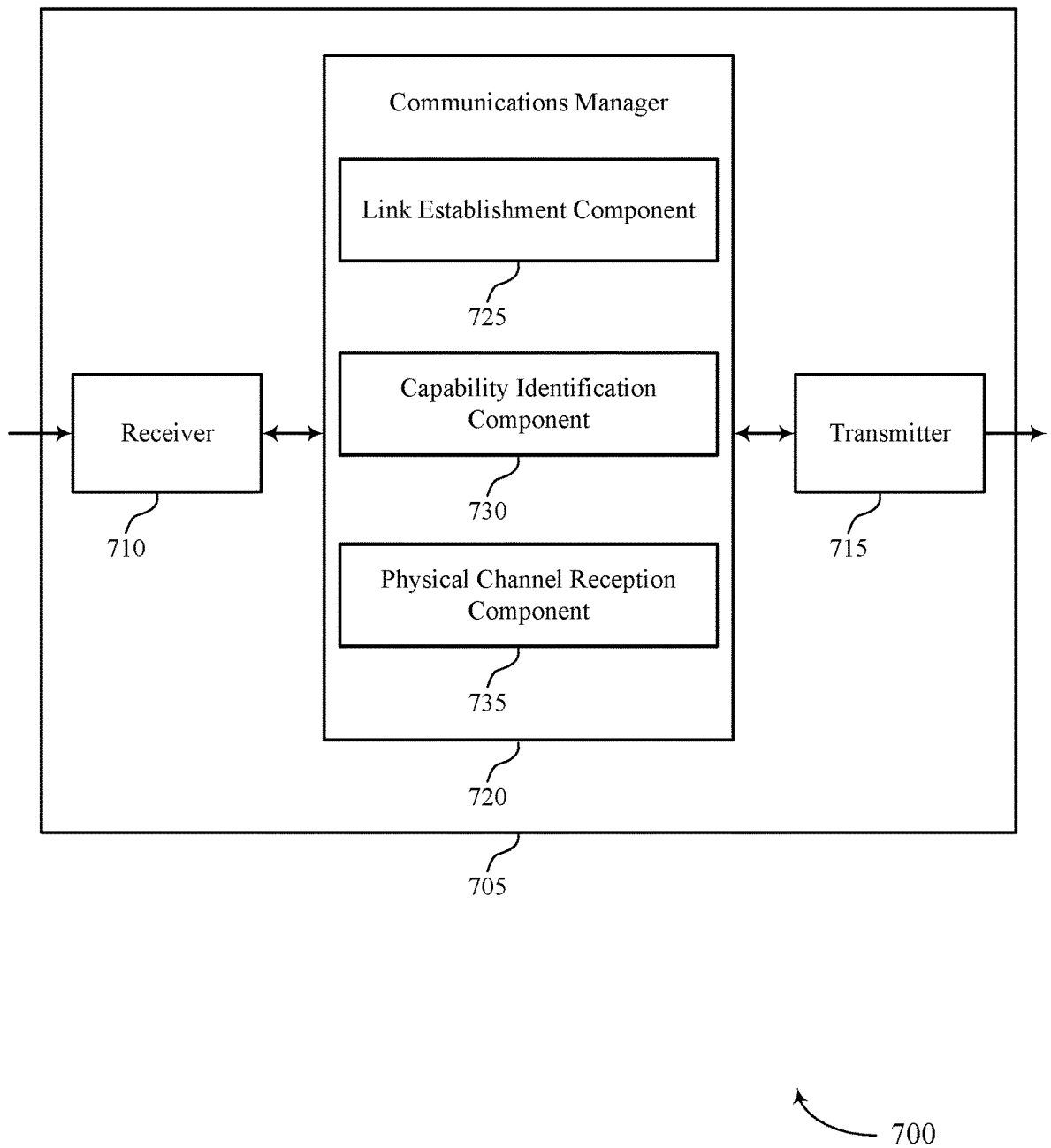

FIG. 7 shows a block diagram 700 of a device 705 that supports demodulation reference signal bundling for sidelink communications in accordance with aspects of the present disclosure. The device 705 may be an example of aspects of a device 505 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to demodulation reference signal bundling for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to demodulation reference signal bundling for sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of demodulation reference signal bundling for sidelink communications as described herein. For example, the communications manager 720 may include a link establishment component 725, a capability identification component 730, or a physical channel reception component 735, or any combination thereof. The communications manager 720 may be an example of aspects of a communications manager 520 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication in accordance with examples as disclosed herein. The link establishment component 725 may be configured as or otherwise support a means for establishing, at a first wireless device, a sidelink communications link with a second wireless device. The capability identification component 730 may be configured as or otherwise support a means for receiving, from the second wireless device, an indication of a capability of the second wireless device to support a configuration for phase continuity between physical channel transmissions of the sidelink communications link. The physical channel reception component 735 may be configured as or otherwise support a means for receiving, by the first wireless device and based on receiving the indication of the capability of the first wireless device, one or more physical channel transmissions from the second wireless device in accordance with the indicated configuration for phase continuity between physical channel transmissions of the sidelink communications link.

Figure 8:
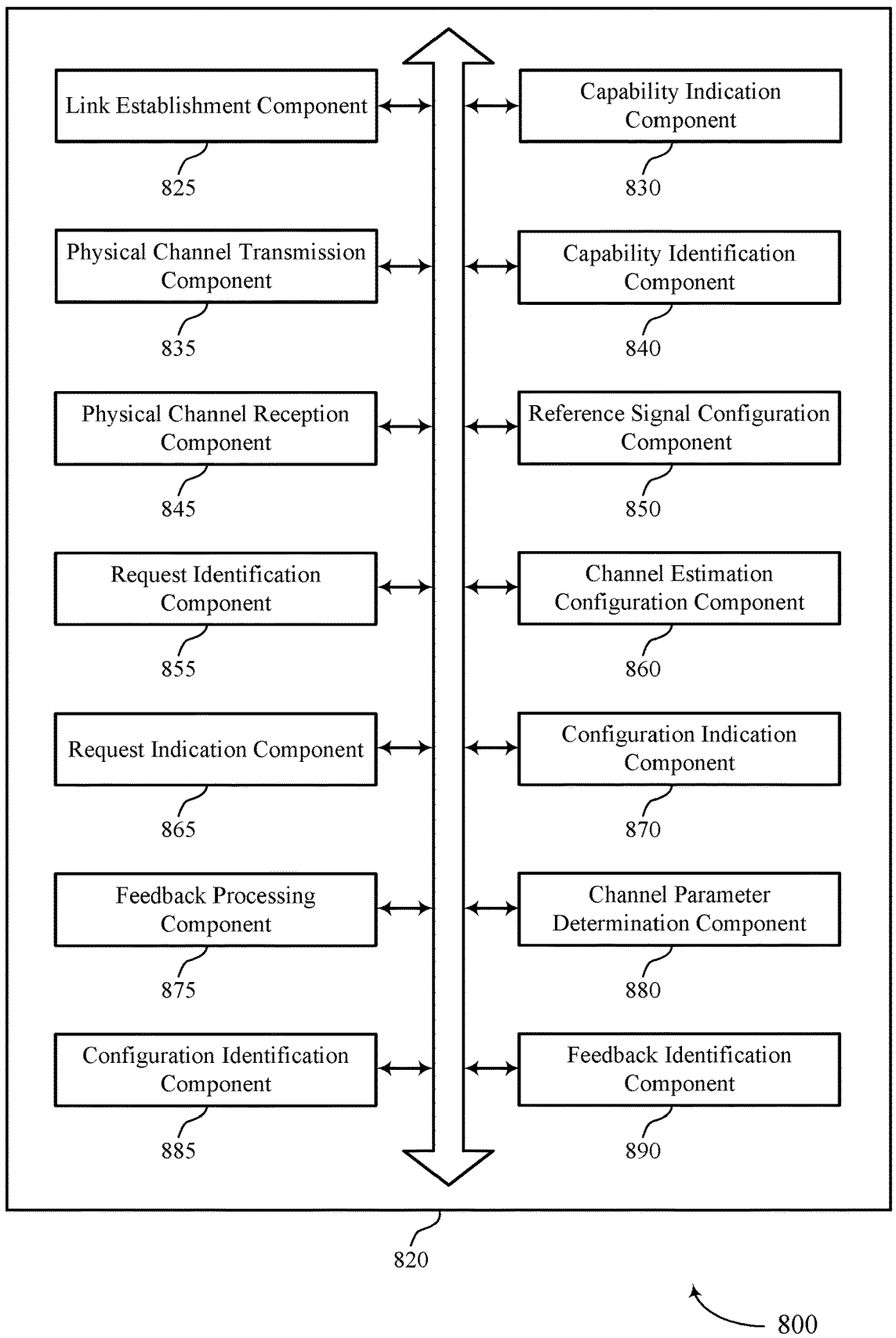
FIG. 8 shows a block diagram of a communications manager that supports demodulation reference signal bundling for sidelink communications in accordance with aspects of the present disclosure.

FIG. 8 shows a block diagram 800 of a communications manager 820 that supports demodulation reference signal bundling for sidelink communications in accordance with aspects of the present disclosure. The communications manager 820 may be an example of aspects of a communications manager 520, a communications manager 620, or both, as described herein. The communications manager 820, or various components thereof, may be an example of means for performing various aspects of demodulation reference signal bundling for sidelink communications as described herein. For example, the communications manager 820 may include a link establishment component 825, a capability indication component 830, a physical channel transmission component 835, a capability identification component 840, a physical channel reception component 845, a reference signal configuration component 850, a request identification component 855, a channel estimation configuration component 860, a request indication component 865, a configuration indication component 870, a feedback processing component 875, a channel parameter determination component 880, a configuration identification component 885, a feedback identification component 890, or any combination thereof. Each of these components may communicate, directly or indirectly, with one another (e.g., via one or more buses).

The communications manager 820 may support physical channel transmission in accordance with examples as disclosed herein. The link establishment component 825 may be configured as or otherwise support a means for establishing (e.g., at a first wireless device) a sidelink communications link with a second wireless device. The capability indication component 830 may be configured as or otherwise support a means for transmitting, to the second wireless device, an indication of a capability of the first wireless device to support a configuration for phase continuity between physical channel transmissions of the sidelink communications link. The physical channel transmission component 835 may be configured as or otherwise support a means for transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

In some examples, to support transmitting the one or more physical channel transmissions, the physical channel transmission component 835 may be configured as or otherwise support a means for transmitting, during a first transmission time interval, a first physical channel transmission over the sidelink communications link, the first physical channel transmission associated with a first set of one or more demodulation reference signals. In some examples, to support transmitting the one or more physical channel transmissions, the physical channel transmission component 835 may be configured as or otherwise support a means for transmitting, during a second transmission time interval, a second physical channel transmission over the sidelink communications link, the second physical channel transmission associated with a second set of one or more demodulation reference signals. In some examples, the first set of one or more demodulation reference signals and the second set of one or more demodulation reference signals may be configured (e.g., by the reference signal configuration component 850) for joint channel estimation.

In some examples, the configuration indication component 870 may be configured as or otherwise support a means for transmitting, during the first transmission time interval or the second transmission time interval, an indication that the first set of one or more demodulation reference signals and the second set of one or more demodulation reference signals are configured for joint channel estimation.

In some examples, the configuration indication component 870 may be configured as or otherwise support a means for transmitting, before the first transmission time interval, radio resource control signaling or medium access control signaling that indicates a duration for activating the configuration for phase continuity between physical channel transmissions of the sidelink communications link, and the first transmission time interval and the second transmission time interval may be within the indicated duration.

In some examples, the first physical channel transmission and the second physical channel transmission may be transmitted with a same resource in the frequency domain, with a same transmission power, with a same resource in the spatial domain, with a same antenna port, or with a same precoding, or any combination thereof.

In some examples, the configuration for joint channel estimation may be based on a duration between the first transmission time interval and the second transmission time interval being less than or equal to a threshold.

In some examples, the feedback processing component 875 may be configured as or otherwise support a means for performing feedback operations in accordance with a negative-acknowledgment-only feedback configuration, or refraining from performing a transmission of the feedback operations, based on a resource pool associated with the feedback operations being different than a resource pool associated with the second physical channel, or a duration between a feedback physical channel and the second physical channel, or both.

In some examples, transmitting the one or more physical channel transmissions in accordance with the indicated configuration for phase continuity may be based on a priority or a quality of service associated with the one or more physical channel transmissions.

In some examples, the request identification component 855 may be configured as or otherwise support a means for receiving a request from the second wireless device to perform transmissions in accordance with the configuration for phase continuity, and transmitting the one or more physical channel transmissions may be in accordance with the indicated configuration for phase continuity based on receiving the request.

In some examples, the capability identification component 840 may be configured as or otherwise support a means for receiving an indication of a capability of the second wireless device to support the configuration for phase continuity between physical channel transmissions of the sidelink communications link, and transmitting the one or more physical channel transmissions may be in accordance with the indicated configuration for phase continuity based on receiving the indication of the capability of the second wireless device.

In some examples, the one or more physical channel transmissions are transmitted using a resource pool, associated with the established sidelink communications link, that is allocated to sidelink transmissions in accordance with the configuration for phase continuity between physical channel transmissions.

In some examples, to support transmitting the one or more physical channel transmissions, the physical channel transmission component 835 may be configured as or otherwise support a means for transmitting the one or more physical channel transmissions in accordance with the indicated configuration for phase continuity using a first modem, associated with the sidelink communications link, that is different than a second modem associated with communications between the first wireless device and a base station.

In some examples, the configuration for phase continuity between physical channel transmissions of the sidelink communications link may be associated with phase continuity between physical sidelink control channel transmissions, phase continuity between physical sidelink shared channel transmissions, or physical sidelink feedback channel transmissions, or a combination thereof.

In some examples, the indication of the capability of the first wireless device to support the configuration for phase continuity between physical channel transmissions of the sidelink communications link may include a respective capability indication for each physical channel of a set of one or more physical channels, for each resource pool of a set of one or more resource pools, or for a combination thereof.

Additionally or alternatively, the communications manager 820 may support physical channel reception in accordance with examples as disclosed herein. The link establishment component 825 may be configured as or otherwise support a means for establishing (e.g., at a first wireless device) a sidelink communications link with a second wireless device. The capability identification component 840 may be configured as or otherwise support a means for receiving, from the second wireless device, an indication of a capability of the second wireless device to support a configuration for phase continuity between physical channel transmissions of the sidelink communications link. The physical channel reception component 845 may be configured as or otherwise support a means for receiving, by the first wireless device and based on receiving the indication of the capability of the second wireless device, one or more physical channel transmissions from the second wireless device in accordance with the indicated configuration for phase continuity between physical channel transmissions of the sidelink communications link.

In some examples, to support receiving the one or more physical channel transmissions, the physical channel reception component 845 may be configured as or otherwise support a means for receiving, during a first transmission time interval, a first physical channel transmission over the sidelink communications link, the first physical channel transmission associated with a first set of one or more demodulation reference signals. In some examples, to support receiving the one or more physical channel transmissions, the physical channel reception component 845 may be configured as or otherwise support a means for receiving, during a second transmission time interval, a second physical channel transmission over the sidelink communications link, the second physical channel transmission associated with a second set of one or more demodulation reference signals. In some examples, the first set of one or more demodulation reference signals and the second set of one or more demodulation reference signals may be configured for joint channel estimation.

In some examples, the channel parameter determination component 880 may be configured as or otherwise support a means for determining a channel parameter associated with the first physical channel transmission, a channel parameter associated with the second physical channel transmission, or both based on a joint channel estimation associated with the first set of one or more demodulation reference signals and the second set of one or more demodulation reference signals.

In some examples, the configuration identification component 885 may be configured as or otherwise support a means for receiving, during the first transmission time interval or the second transmission time interval, an indication that the first set of one or more demodulation reference signals and the second set of one or more demodulation reference signals are configured for joint channel estimation.

In some examples, the configuration identification component 885 may be configured as or otherwise support a means for receiving, before the first transmission time interval, radio resource control signaling or medium access control signaling that indicates a duration for activating the configuration for phase continuity between physical channel transmissions of the sidelink communications link, and the first transmission time interval and the second transmission time interval may be within the indicated duration.

In some examples, the configuration for joint channel estimation may be based on a duration between the first transmission time interval and the second transmission time interval being less than or equal to a threshold.

In some examples, the feedback identification component 890 may be configured as or otherwise support a means for receiving a feedback physical channel in accordance with a negative-acknowledgment-only feedback configuration based on a resource pool associated with the feedback operations being different than a resource pool associated with the second physical channel, or a duration between the feedback physical channel and the second physical channel, or a combination thereof.

In some examples, receiving the one or more physical channel transmissions in accordance with the indicated configuration for phase continuity may be based on a priority or a quality of service associated with the one or more physical channel transmissions.

In some examples, the request indication component 865 may be configured as or otherwise support a means for transmitting a request to the second wireless device to perform transmissions in accordance with the configuration for phase continuity, and receiving the one or more physical channel transmissions may be in accordance with the indicated configuration for phase continuity based on transmitting the request.

In some examples, the capability indication component 830 may be configured as or otherwise support a means for transmitting an indication of a capability of the first wireless device to support the configuration for phase continuity between physical channel transmissions of the sidelink communications link, and receiving the one or more physical channel transmissions may be in accordance with the indicated configuration for phase continuity based on transmitting the indication of the capability of the first wireless device.

In some examples, the one or more physical channel transmissions may be received using a resource pool, associated with the established sidelink communications link, that is allocated to sidelink transmissions in accordance with the configuration for phase continuity between physical channel transmissions.

In some examples, to support receiving the one or more physical channel transmissions, the physical channel reception component 845 may be configured as or otherwise support a means for receiving the one or more physical channel transmissions in accordance with the indicated configuration for phase continuity using a first modem, associated with the sidelink communications link, that is different than a second modem associated with communications between the first wireless device and a base station.

In some examples, the configuration for phase continuity between physical channel transmissions of the sidelink communications link may be associated with phase continuity between physical sidelink control channel transmissions, phase continuity between physical sidelink shared channel transmissions, or physical sidelink feedback channel transmissions, or a combination thereof.

In some examples, the indication of the capability of the second wireless device to support the configuration for phase continuity between physical channel transmissions of the sidelink communications link may include a respective capability indication for each physical channel of a set of one or more physical channels, for each resource pool of a set of one or more resource pools, or for a combination thereof.

Figure 9:
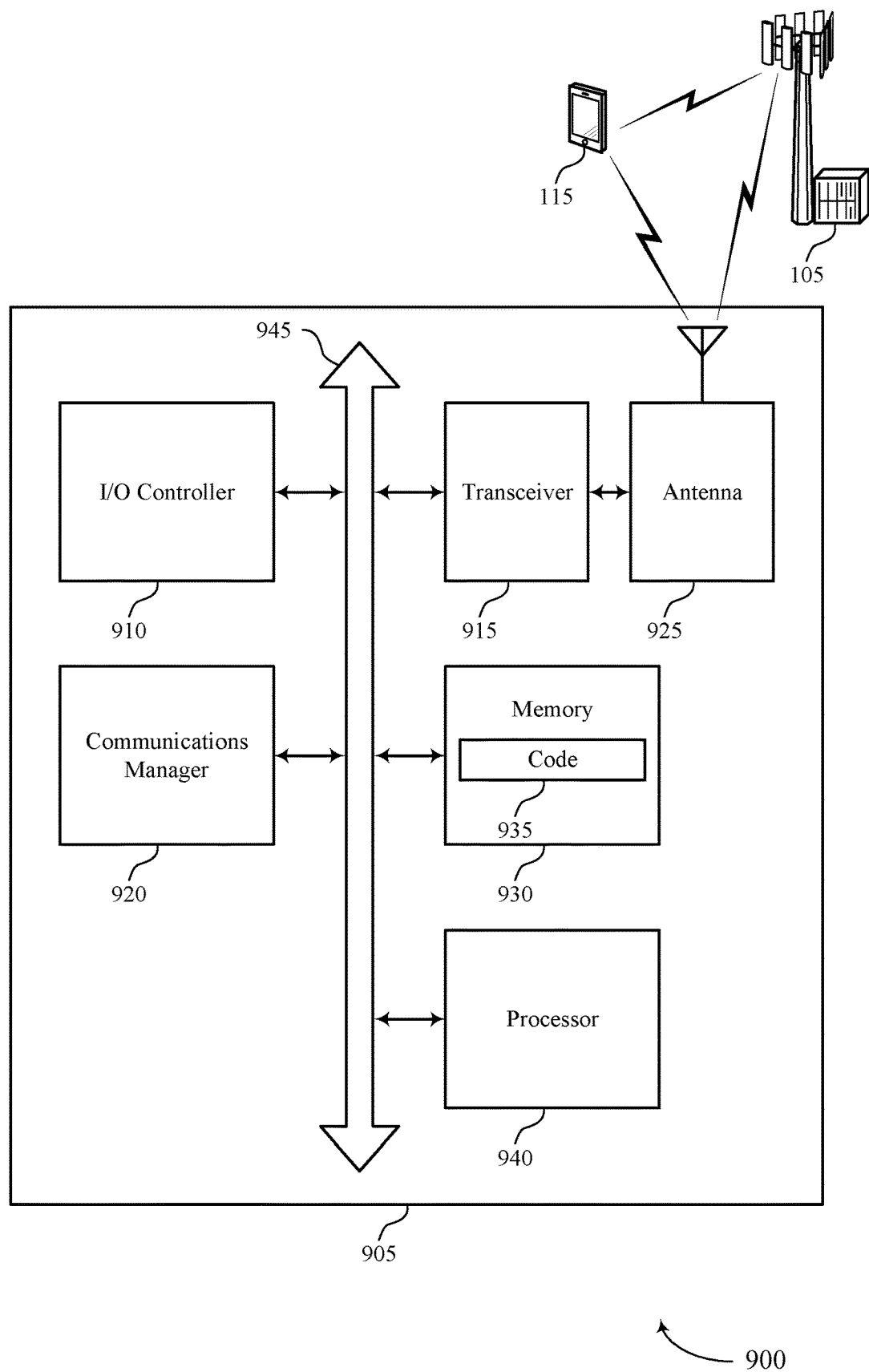
FIG. 9 shows a diagram of a system including a device that supports demodulation reference signal bundling for sidelink communications in accordance with aspects of the present disclosure.

FIG. 9 shows a diagram of a system 900 including a device 905 that supports demodulation reference signal bundling for sidelink communications in accordance with aspects of the present disclosure. The device 905 may be an example of or include the components of a device 505, a device 605, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting demodulation reference signal bundling for sidelink communications). For example, the device 905 or a component of the device 905 may include a processor 940 and memory 930 coupled to the processor 940, the processor 940 and memory 930 configured to perform various functions described herein.

The communications manager 920 may support physical channel transmission in accordance with examples as disclosed herein. For example, the communications manager 920 may be configured as or otherwise support a means for establishing (e.g., at a first wireless device), a sidelink communications link with a second wireless device. The communications manager 920 may be configured as or otherwise support a means for transmitting, to the second wireless device, an indication of a capability of the first wireless device to support a configuration for phase continuity between physical channel transmissions of the sidelink communications link. The communications manager 920 may be configured as or otherwise support a means for transmitting, by the first wireless device and based on transmitting the indication of the capability of the first wireless device, one or more physical channel transmissions to the second wireless device in accordance with the indicated configuration for phase continuity between physical channel transmissions of the sidelink communications link.

Additionally or alternatively, the communications manager 920 may support physical channel reception in accordance with examples as disclosed herein. For example, the communications manager 920 may be configured as or otherwise support a means for establishing (e.g., at a first wireless device) a sidelink communications link with a second wireless device. The communications manager 920 may be configured as or otherwise support a means for receiving, from the second wireless device, an indication of a capability of the second wireless device to support a configuration for phase continuity between physical channel transmissions of the sidelink communications link. The communications manager 920 may be configured as or otherwise support a means for receiving, by the first wireless device and based on receiving the indication of the capability of the second wireless device, one or more physical channel transmissions from the second wireless device in accordance with the indicated configuration for phase continuity between physical channel transmissions of the sidelink communications link.

By including or configuring the communications manager 920 in accordance with examples as described herein, the device 905 may support sidelink transmission techniques for maintaining phase continuity between physical channel transmissions, or bundling DMRS transmissions, or sidelink reception techniques for performing joint channel estimation across sidelink physical channel transmissions. In various examples, such techniques may provide a greater quantity of DMRSs for channel estimation such as phase determination, without occupying communication resources of a given sidelink TTI, which may support efficient processes for improving sidelink communications reliability and resource utilization. Such techniques may be particularly valuable to sidelink communications relying on high reliability, low latency, or both.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of demodulation reference signal bundling for sidelink communications as described herein, or the processor 940 and the memory 930 may be otherwise configured to perform or support such operations.

Figure 10:
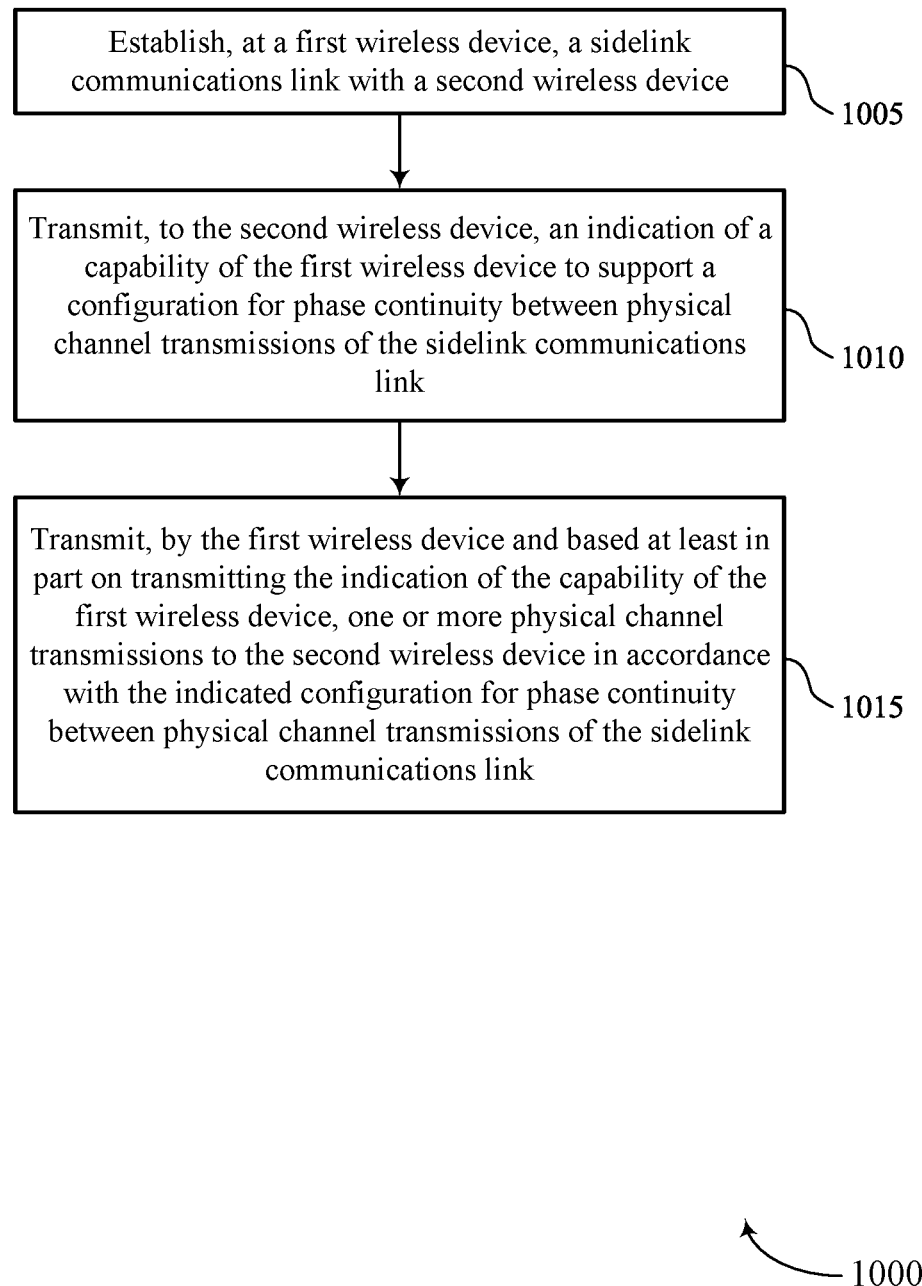
FIGS. 10 through 13 show flowcharts illustrating methods that support demodulation reference signal bundling for sidelink communications in accordance with aspects of the present disclosure.

FIG. 10 shows a flowchart illustrating a method 1000 that supports demodulation reference signal bundling for sidelink communications in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include establishing, at a first wireless device, a sidelink communications link with a second wireless device. The operations of 1005 may be performed in accordance with examples as disclosed herein. In some examples, aspects of the operations of 1005 may be performed by a link establishment component 825 as described with reference to FIG. 8.

At 1010, the method may include transmitting, to the second wireless device, an indication of a capability of the first wireless device to support a configuration for phase continuity between physical channel transmissions of the sidelink communications link. The operations of 1010 may be performed in accordance with examples as disclosed herein. In some examples, aspects of the operations of 1010 may be performed by a capability indication component 830 as described with reference to FIG. 8.

At 1015, the method may include transmitting, by the first wireless device and based on transmitting the indication of the capability of the first wireless device, one or more physical channel transmissions to the second wireless device in accordance with the indicated configuration for phase continuity between physical channel transmissions of the sidelink communications link. The operations of 1015 may be performed in accordance with examples as disclosed herein. In some examples, aspects of the operations of 1015 may be performed by a physical channel transmission component 835 as described with reference to FIG. 8.

Figure 11:
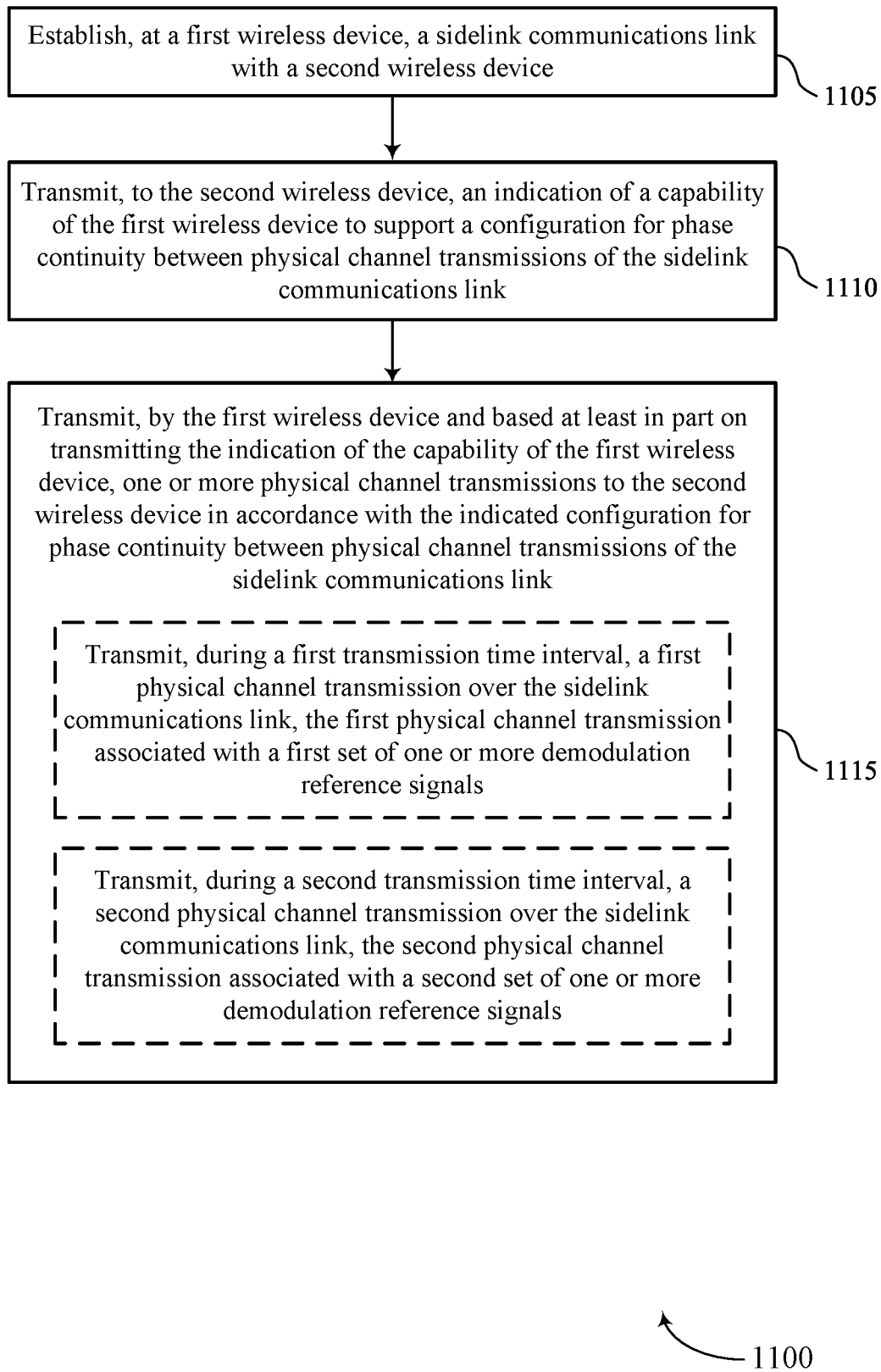

FIG. 11 shows a flowchart illustrating a method 1100 that supports demodulation reference signal bundling for sidelink communications in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include establishing, at a first wireless device, a sidelink communications link with a second wireless device. The operations of 1105 may be performed in accordance with examples as disclosed herein. In some examples, aspects of the operations of 1105 may be performed by a link establishment component 825 as described with reference to FIG. 8.

At 1110, the method may include transmitting, to the second wireless device, an indication of a capability of the first wireless device to support a configuration for phase continuity between physical channel transmissions of the sidelink communications link. The operations of 1110 may be performed in accordance with examples as disclosed herein. In some examples, aspects of the operations of 1110 may be performed by a capability indication component 830 as described with reference to FIG. 8.

At 1115, the method may include transmitting, by the first wireless device and based on transmitting the indication of the capability of the first wireless device, one or more physical channel transmissions to the second wireless device in accordance with the indicated configuration for phase continuity between physical channel transmissions of the sidelink communications link. In some examples, the transmitting of 1015 may include transmitting, during a first transmission time interval, a first physical channel transmission over the sidelink communications link, the first physical channel transmission associated with a first set of one or more demodulation reference signals (e.g., of the first transmission time interval), and transmitting, during a second transmission time interval, a second physical channel transmission over the sidelink communications link, the second physical channel transmission associated with a second set of one or more demodulation reference signals (e.g., of the second transmission time interval). The operations of 1115 may be performed in accordance with examples as disclosed herein. In some examples, aspects of the operations of 1115 may be performed by a physical channel transmission component 835 as described with reference to FIG. 8. In some examples, the first set of one or more demodulation reference signals and the second set of one or more demodulation reference signals may be configured (e.g., by a reference signal configuration component 850 as described with reference to FIG. 8) for joint channel estimation.

Figure 12:
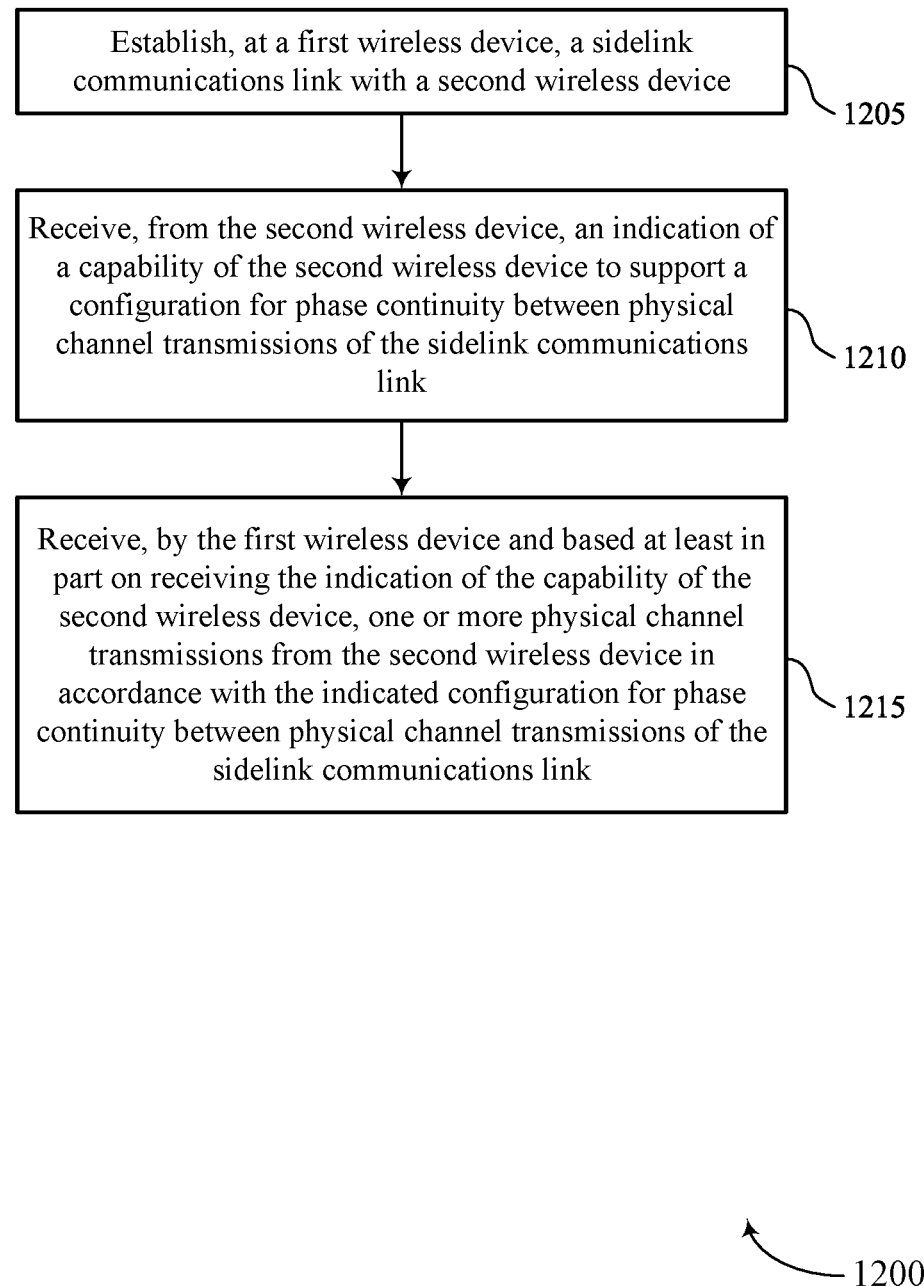

FIG. 12 shows a flowchart illustrating a method 1200 that supports demodulation reference signal bundling for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include establishing, at a first wireless device, a sidelink communications link with a second wireless device. The operations of 1205 may be performed in accordance with examples as disclosed herein. In some examples, aspects of the operations of 1205 may be performed by a link establishment component 825 as described with reference to FIG. 8.

At 1210, the method may include receiving, from the second wireless device, an indication of a capability of the second wireless device to support a configuration for phase continuity between physical channel transmissions of the sidelink communications link. The operations of 1210 may be performed in accordance with examples as disclosed herein. In some examples, aspects of the operations of 1210 may be performed by a capability identification component 840 as described with reference to FIG. 8.

At 1215, the method may include receiving, by the first wireless device and based on receiving the indication of the capability of the second wireless device, one or more physical channel transmissions from the second wireless device in accordance with the indicated configuration for phase continuity between physical channel transmissions of the sidelink communications link. The operations of 1215 may be performed in accordance with examples as disclosed herein. In some examples, aspects of the operations of 1215 may be performed by a physical channel reception component 845 as described with reference to FIG. 8.

Figure 13:
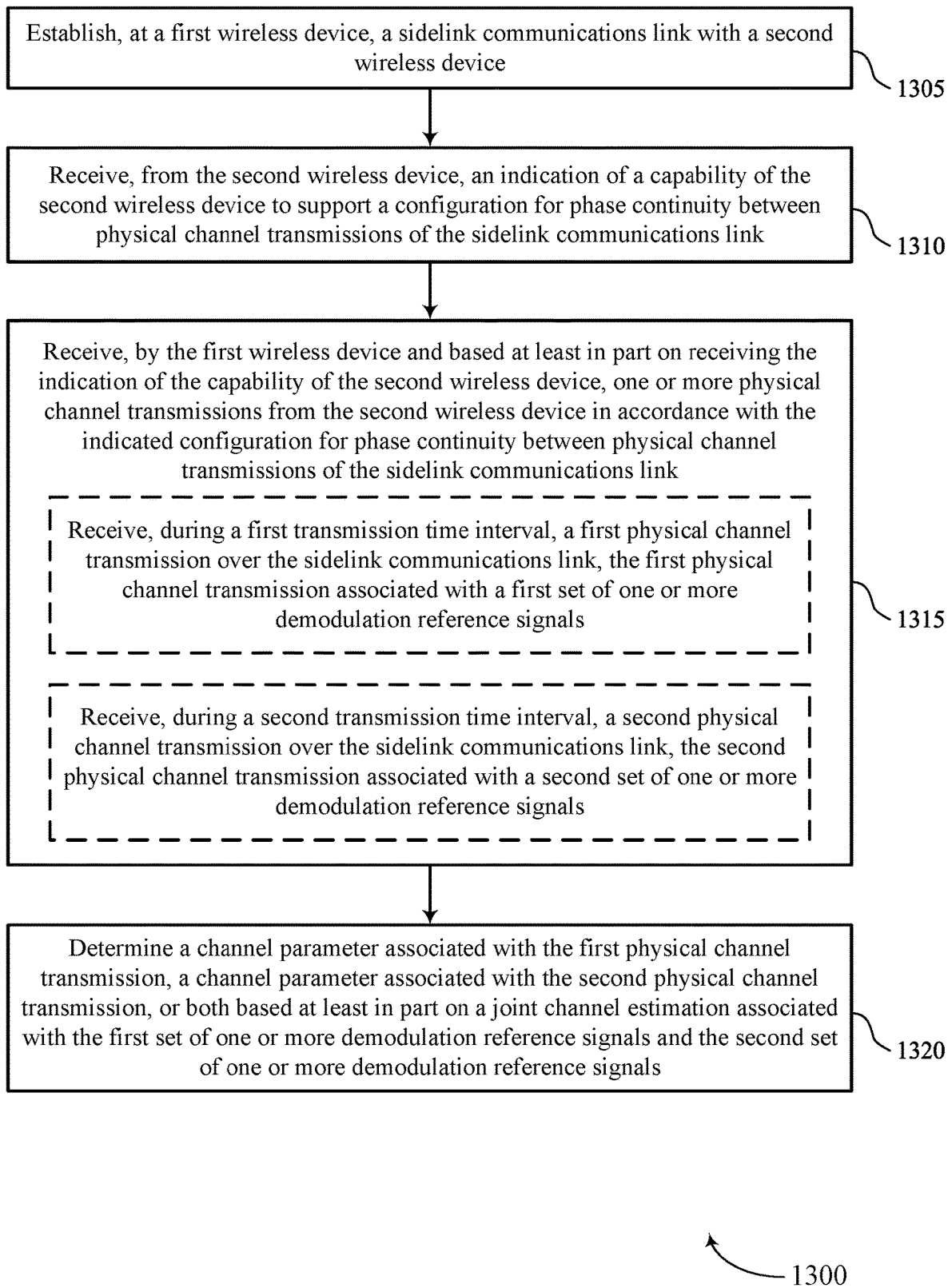

FIG. 13 shows a flowchart illustrating a method 1300 that supports demodulation reference signal bundling for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include establishing, at a first wireless device, a sidelink communications link with a second wireless device. The operations of 1305 may be performed in accordance with examples as disclosed herein. In some examples, aspects of the operations of 1305 may be performed by a link establishment component 825 as described with reference to FIG. 8.

At 1310, the method may include receiving, from the second wireless device, an indication of a capability of the second wireless device to support a configuration for phase continuity between physical channel transmissions of the sidelink communications link. The operations of 1310 may be performed in accordance with examples as disclosed herein. In some examples, aspects of the operations of 1310 may be performed by a capability identification component 840 as described with reference to FIG. 8.

At 1315, the method may include receiving, by the first wireless device and based on receiving the indication of the capability of the second wireless device, one or more physical channel transmissions from the second wireless device in accordance with the indicated configuration for phase continuity between physical channel transmissions of the sidelink communications link. In some examples, the receiving of 1215 may include receiving, during a first transmission time interval, a first physical channel transmission over the sidelink communications link, the first physical channel transmission associated with a first set of one or more demodulation reference signals, and receiving, during a second transmission time interval, a second physical channel transmission over the sidelink communications link, the second physical channel transmission associated with a second set of one or more demodulation reference signals. The operations of 1315 may be performed in accordance with examples as disclosed herein. In some examples, aspects of the operations of 1315 may be performed by a physical channel reception component 845 as described with reference to FIG. 8. In some examples, the first set of one or more demodulation reference signals and the second set of one or more demodulation reference signals may be configured for joint channel estimation (e.g., by a channel estimation configuration component 860 as described with reference to FIG. 8).

At 1320, the method may include determining a channel parameter associated with the first physical channel transmission, a channel parameter associated with the second physical channel transmission, or both based on a joint channel estimation associated with the first set of one or more demodulation reference signals and the second set of one or more demodulation reference signals (e.g., in accordance with the phase continuity associated with the configuration of the first and second sets of demodulation reference signals). The operations of 1320 may be performed in accordance with examples as disclosed herein. In some examples, aspects of the operations of 1320 may be performed by a channel parameter determination component 880 as described with reference to FIG. 8.

The following provides an overview of aspects of the present disclosure:

Aspect 1: A method for wireless communication, comprising: establishing, at a first wireless device, a sidelink communications link with a second wireless device; transmitting, to the second wireless device, an indication of a capability of the first wireless device to support a configuration for phase continuity between physical channel transmissions of the sidelink communications link; and transmitting, by the first wireless device and based at least in part on transmitting the indication of the capability of the first wireless device, one or more physical channel transmissions to the second wireless device in accordance with the indicated configuration for phase continuity between physical channel transmissions of the sidelink communications link.

Aspect 2: The method of aspect 1, wherein transmitting the one or more physical channel transmissions comprises: transmitting, during a first transmission time interval, a first physical channel transmission over the sidelink communications link, the first physical channel transmission associated with a first set of one or more demodulation reference signals; and transmitting, during a second transmission time interval, a second physical channel transmission over the sidelink communications link, the second physical channel transmission associated with a second set of one or more demodulation reference signals, wherein the first set of one or more demodulation reference signals and the second set of one or more demodulation reference signals are configured for joint channel estimation.

Aspect 3: The method of aspect 2, further comprising: transmitting, during the first transmission time interval or the second transmission time interval, an indication that the first set of one or more demodulation reference signals and the second set of one or more demodulation reference signals are configured for joint channel estimation.

Aspect 4: The method of any of aspects 2 through 3, further comprising: transmitting, before the first transmission time interval, radio resource control signaling or medium access control signaling that indicates a duration for activating the configuration for phase continuity between physical channel transmissions of the sidelink communications link, wherein the first transmission time interval and the second transmission time interval are within the indicated duration.

Aspect 5: The method of any of aspects 2 through 4, wherein the first physical channel transmission and the second physical channel transmission are transmitted with a same resource in the frequency domain, with a same transmission power, with a same resource in the spatial domain, with a same antenna port, or with a same precoding, or any combination thereof.

Aspect 6: The method of any of aspects 2 through 5, wherein the configuration for joint channel estimation is based at least in part on a duration between the first transmission time interval and the second transmission time interval being less than or equal to a threshold.

Aspect 7: The method of any of aspects 2 through 6, further comprising: performing feedback operations in accordance with a negative-acknowledgment-only feedback configuration, or refraining from performing a transmission of the feedback operations, based at least in part on a resource pool associated with the feedback operations being different than a resource pool associated with the second channel, or a duration between a feedback physical channel and the second physical channel, or both.

Aspect 8: The method of any of aspects 1 through 7, wherein transmitting the one or more physical channel transmissions in accordance with the indicated configuration for phase continuity is based at least in part on a priority or a quality of service associated with the one or more physical channel transmissions.

Aspect 9: The method of any of aspects 1 through 8, further comprising: receiving a request from the second wireless device to perform transmissions in accordance with the configuration for phase continuity, wherein transmitting the one or more physical channel transmissions is in accordance with the indicated configuration for phase continuity based at least in part on receiving the request.

Aspect 10: The method of any of aspects 1 through 9, further comprising: receiving an indication of a capability of the second wireless device to support the configuration for phase continuity between physical channel transmissions of the sidelink communications link, wherein transmitting the one or more physical channel transmissions is in accordance with the indicated configuration for phase continuity based at least in part on receiving the indication of the capability of the second wireless device.

Aspect 11: The method of any of aspects 1 through 10, wherein the one or more physical channel transmissions are transmitted using a resource pool, associated with the established sidelink communications link, that is allocated to sidelink transmissions in accordance with the configuration for phase continuity between physical channel transmissions.

Aspect 12: The method of any of aspects 1 through 11, wherein transmitting the one or more physical channel transmissions comprises: transmitting the one or more physical channel transmissions in accordance with the indicated configuration for phase continuity using a first modem, associated with the sidelink communications link, that is different than a second modem associated with communications between the first wireless device and a base station.

Aspect 13: The method of any of aspects 1 through 12, wherein the configuration for phase continuity between physical channel transmissions of the sidelink communications link is associated with phase continuity between physical sidelink control channel transmissions, phase continuity between physical sidelink shared channel transmissions, or physical sidelink feedback channel transmissions, or a combination thereof.

Aspect 14: The method of any of aspects 1 through 13, wherein the indication of the capability of the first wireless device to support the configuration for phase continuity between physical channel transmissions of the sidelink communications link comprises a respective capability indication for each physical channel of a set of one or more physical channels, for each resource pool of a set of one or more resource pools, or for a combination thereof.

Aspect 15: A method for wireless communication, comprising: establishing, at a first wireless device, a sidelink communications link with a second wireless device; receiving, from the second wireless device, an indication of a capability of the second wireless device to support a configuration for phase continuity between physical channel transmissions of the sidelink communications link; and receiving, by the first wireless device and based at least in part on receiving the indication of the capability of the second wireless device, one or more physical channel transmissions from the second wireless device in accordance with the indicated configuration for phase continuity between physical channel transmissions of the sidelink communications link.

Aspect 16: The method of aspect 15, wherein receiving the one or more physical channel transmissions comprises: receiving, during a first transmission time interval, a first physical channel transmission over the sidelink communications link, the first physical channel transmission associated with a first set of one or more demodulation reference signals; and receiving, during a second transmission time interval, a second physical channel transmission over the sidelink communications link, the second physical channel transmission associated with a second set of one or more demodulation reference signals, wherein the first set of one or more demodulation reference signals and the second set of one or more demodulation reference signals are configured for joint channel estimation.

Aspect 17: The method of aspect 16, further comprising: determining a channel parameter associated with the first physical channel transmission, a channel parameter associated with the second physical channel transmission, or both based at least in part on a joint channel estimation associated with the first set of one or more demodulation reference signals and the second set of one or more demodulation reference signals.

Aspect 18: The method of any of aspects 16 through 17, further comprising: receiving, during the first transmission time interval or the second transmission time interval, an indication that the first set of one or more demodulation reference signals and the second set of one or more demodulation reference signals are configured for joint channel estimation.

Aspect 19: The method of any of aspects 16 through 18, further comprising: receiving, before the first transmission time interval, radio resource control signaling or medium access control signaling that indicates a duration for activating the configuration for phase continuity between physical channel transmissions of the sidelink communications link, wherein the first transmission time interval and the second transmission time interval are within the indicated duration.

Aspect 20: The method of any of aspects 16 through 19, wherein the configuration for joint channel estimation is based at least in part on a duration between the first transmission time interval and the second transmission time interval being less than or equal to a threshold.

Aspect 21: The method of any of aspects 16 through 20, further comprising: receiving a feedback physical channel in accordance with a negative-acknowledgment-only feedback configuration based at least in part on a resource pool associated with the feedback operations being different than a resource pool associated with the second physical channel, or a duration between the feedback physical channel and the second physical channel, or a combination thereof.

Aspect 22: The method of any of aspects 15 through 21, wherein receiving the one or more physical channel transmissions in accordance with the indicated configuration for phase continuity based at least in part on a priority or a quality of service associated with the one or more physical channel transmissions.

Aspect 23: The method of any of aspects 15 through 22, further comprising: transmitting a request to the second wireless device to perform transmissions in accordance with the configuration for phase continuity, wherein receiving the one or more physical channel transmissions is in accordance with the indicated configuration for phase continuity based at least in part on transmitting the request.

Aspect 24: The method of any of aspects 15 through 23, further comprising: transmitting an indication of a capability of the first wireless device to support the configuration for phase continuity between physical channel transmissions of the sidelink communications link, wherein receiving the one or more physical channel transmissions is in accordance with the indicated configuration for phase continuity based at least in part on transmitting the indication of the capability of the first wireless device.

Aspect 25: The method of any of aspects 15 through 24, wherein the one or more physical channel transmissions are received using a resource pool, associated with the established sidelink communications link, that is allocated to sidelink transmissions in accordance with the configuration for phase continuity between physical channel transmissions.

Aspect 26: The method of any of aspects 15 through 25, wherein receiving the one or more physical channel transmissions comprises: receiving the one or more physical channel transmissions in accordance with the indicated configuration for phase continuity using a first modem, associated with the sidelink communications link, that is different than a second modem associated with communications between the first wireless device and a base station.

Aspect 27: The method of any of aspects 15 through 26, wherein the configuration for phase continuity between physical channel transmissions of the sidelink communications link is associated with phase continuity between physical sidelink control channel transmissions, phase continuity between physical sidelink shared channel transmissions, or physical sidelink feedback channel transmissions, or a combination thereof.

Aspect 28: The method of any of aspects 15 through 27, wherein the indication of the capability of the second wireless device to support the configuration for phase continuity between physical channel transmissions of the sidelink communications link comprises a respective capability indication for each physical channel of a set of one or more physical channels, for each resource pool of a set of one or more resource pools, or for a combination thereof.

Aspect 29: An apparatus for wireless communication, comprising a processor; memory coupled with the processor; and instructions stored in the memory and executable by the processor to cause the apparatus to perform a method of any of aspects 1 through 14.

Aspect 30: An apparatus for wireless communication, comprising at least one means for performing a method of any of aspects 1 through 14.

Aspect 31: A non-transitory computer-readable medium storing code for wireless communication, the code comprising instructions executable by a processor to perform a method of any of aspects 1 through 14.

Aspect 32: An apparatus for wireless communication, comprising a processor; memory coupled with the processor; and instructions stored in the memory and executable by the processor to cause the apparatus to perform a method of any of aspects 15 through 28.

Aspect 33: An apparatus for wireless communication, comprising at least one means for performing a method of any of aspects 15 through 28.

Aspect 34: A non-transitory computer-readable medium storing code for wireless communication, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
    establishing, at a first wireless device, a sidelink communications link with a second wireless device;
    transmitting, to the second wireless device, an indication of a capability of the first wireless device to support a configuration for sidelink reference signal bundling and phase continuity between physical sidelink channel transmissions of the sidelink communications link; and
    transmitting, by the first wireless device and based at least in part on transmitting the indication of the capability of the first wireless device, one or more physical sidelink channel transmissions to the second wireless device in accordance with the indicated configuration for sidelink reference signal bundling and phase continuity between physical sidelink channel transmissions of the sidelink communications link.

2. The method of claim 1, wherein transmitting the one or more physical sidelink channel transmissions comprises:
    transmitting, during a first transmission time interval, a first physical sidelink channel transmission over the sidelink communications link, the first physical sidelink channel transmission associated with a first set of one or more sidelink demodulation reference signals; and
    transmitting, during a second transmission time interval, a second physical sidelink channel transmission over the sidelink communications link, the second physical sidelink channel transmission associated with a second set of one or more sidelink demodulation reference signals,
    wherein the first set of one or more sidelink demodulation reference signals and the second set of one or more sidelink demodulation reference signals are configured for joint channel estimation.

3. The method of claim 2, further comprising:
    transmitting, during the first transmission time interval or the second transmission time interval, an indication that the first set of one or more sidelink demodulation reference signals and the second set of one or more sidelink demodulation reference signals are configured for joint channel estimation.

4. The method of claim 2, further comprising:
    transmitting, before the first transmission time interval, radio resource control signaling or medium access control signaling that indicates a duration for activating the configuration for sidelink reference signal bundling and phase continuity between physical sidelink channel transmissions of the sidelink communications link, wherein the first transmission time interval and the second transmission time interval are within the indicated duration.

5. The method of claim 2, wherein the first physical sidelink channel transmission and the second physical sidelink channel transmission are transmitted with a same resource in a frequency domain, with a same transmission power, with a same resource in a spatial domain, with a same antenna port, or with a same precoding, or any combination thereof.

6. The method of claim 2, wherein the configuration for joint channel estimation is based at least in part on a duration between the first transmission time interval and the second transmission time interval being less than or equal to a threshold.

7. The method of claim 2, further comprising:
performing feedback operations in accordance with a negative-acknowledgment-only feedback configuration, or refraining from performing a transmission of the feedback operations, based at least in part on a first resource pool associated with the feedback operations being different than a second resource pool associated with the second physical sidelink channel transmission, or a duration between a feedback physical sidelink channel transmission and the second physical sidelink channel transmission, or both.

8. The method of claim 1, wherein transmitting the one or more physical sidelink channel transmissions in accordance with the indicated configuration for sidelink reference signal bundling and phase continuity is based at least in part on a priority or a quality of service associated with the one or more physical sidelink channel transmissions.

9. The method of claim 1, further comprising:
receiving a request from the second wireless device to perform sidelink transmissions in accordance with the configuration for sidelink reference signal bundling and phase continuity, wherein transmitting the one or more physical sidelink channel transmissions is in accordance with the indicated configuration for sidelink reference signal bundling and phase continuity based at least in part on receiving the request.

10. The method of claim 1, further comprising:
receiving an indication of a capability of the second wireless device to support the configuration for sidelink reference signal bundling and phase continuity between physical sidelink channel transmissions of the sidelink communications link, wherein transmitting the one or more physical sidelink channel transmissions is in accordance with the indicated configuration for sidelink reference signal bundling and phase continuity based at least in part on receiving the indication of the capability of the second wireless device.

11. The method of claim 1, wherein the one or more physical sidelink channel transmissions are transmitted using a resource pool, associated with the established sidelink communications link, that is allocated to sidelink transmissions in accordance with the configuration for sidelink reference signal bundling and phase continuity between physical sidelink channel transmissions.

12. The method of claim 1, wherein transmitting the one or more physical sidelink channel transmissions comprises:
transmitting the one or more physical sidelink channel transmissions in accordance with the indicated configuration for sidelink reference signal bundling and phase continuity using a first modem, associated with the sidelink communications link, that is different than a second modem associated with communications between the first wireless device and a network entity.

13. The method of claim 1, wherein the configuration for sidelink reference signal bundling and phase continuity between physical sidelink channel transmissions of the sidelink communications link is associated with sidelink reference signal bundling and phase continuity between physical sidelink control channel transmissions, physical sidelink shared channel transmissions, or physical sidelink feedback channel transmissions, or a combination thereof.

14. The method of claim 1, wherein the indication of the capability of the first wireless device to support the configuration for sidelink reference signal bundling and phase continuity between physical sidelink channel transmissions of the sidelink communications link comprises a respective capability indication for each physical sidelink channel of a set of one or more physical sidelink channels, for each resource pool of a set of one or more resource pools, or for a combination thereof.

15. A method for wireless communication, comprising:
establishing, at a first wireless device, a sidelink communications link with a second wireless device;
receiving, from the second wireless device, an indication of a capability of the second wireless device to support a configuration for sidelink reference signal bundling and phase continuity between physical sidelink channel transmissions of the sidelink communications link; and
receiving, by the first wireless device and based at least in part on receiving the indication of the capability of the second wireless device, one or more physical sidelink channel transmissions from the second wireless device in accordance with the indicated configuration for sidelink reference signal bundling and phase continuity between physical sidelink channel transmissions of the sidelink communications link.

16. The method of claim 15, wherein receiving the one or more physical sidelink channel transmissions comprises:
receiving, during a first transmission time interval, a first physical sidelink channel transmission over the sidelink communications link, the first physical sidelink channel transmission associated with a first set of one or more sidelink demodulation reference signals; and
receiving, during a second transmission time interval, a second physical sidelink channel transmission over the sidelink communications link, the second physical sidelink channel transmission associated with a second set of one or more sidelink demodulation reference signals,
wherein the first set of one or more sidelink demodulation reference signals and the second set of one or more sidelink demodulation reference signals are configured for joint channel estimation.

17. The method of claim 16, further comprising:
determining a first channel parameter associated with the first physical sidelink channel transmission, a second channel parameter associated with the second physical sidelink channel transmission, or both based at least in part on a joint channel estimation associated with the first set of one or more sidelink demodulation reference signals and the second set of one or more sidelink demodulation reference signals.

18. The method of claim 16, further comprising:
receiving, during the first transmission time interval or the second transmission time interval, an indication that the first set of one or more sidelink demodulation reference signals and the second set of one or more sidelink demodulation reference signals are configured for joint channel estimation.

19. The method of claim 16, further comprising:
receiving, before the first transmission time interval, radio resource control signaling or medium access control signaling that indicates a duration for activating the configuration for sidelink reference signal bundling and phase continuity between physical sidelink channel transmissions of the sidelink communications link, wherein the first transmission time interval and the second transmission time interval are within the indicated duration.

20. The method of claim 16, wherein the configuration for joint channel estimation is based at least in part on a duration between the first transmission time interval and the second transmission time interval being less than or equal to a threshold.

21. The method of claim 16, further comprising:
receiving a feedback physical sidelink channel transmission in accordance with a negative-acknowledgment-only feedback configuration based at least in part on a first resource pool associated with feedback operations being different than a second resource pool associated with the second physical sidelink channel transmission, or a duration between the feedback physical sidelink channel transmission and the second physical sidelink channel transmission, or a combination thereof.

22. The method of claim 15, wherein receiving the one or more physical sidelink channel transmissions in accordance with the indicated configuration for sidelink reference signal bundling and phase continuity based at least in part on a priority or a quality of service associated with the one or more physical sidelink channel transmissions.

23. The method of claim 15, further comprising:
transmitting a request to the second wireless device to perform sidelink transmissions in accordance with the configuration for sidelink reference signal bundling and phase continuity, wherein receiving the one or more physical sidelink channel transmissions is in accordance with the indicated configuration for sidelink reference signal bundling and phase continuity based at least in part on transmitting the request.

24. The method of claim 15, further comprising:
transmitting an indication of a capability of the first wireless device to support the configuration for sidelink reference signal bundling and phase continuity between physical sidelink channel transmissions of the sidelink communications link, wherein receiving the one or more physical sidelink channel transmissions is in accordance with the indicated configuration for sidelink reference signal bundling and phase continuity based at least in part on transmitting the indication of the capability of the first wireless device.

25. The method of claim 15, wherein the one or more physical sidelink channel transmissions are received using a resource pool, associated with the established sidelink communications link, that is allocated to sidelink transmissions in accordance with the configuration for sidelink reference signal bundling and phase continuity between physical sidelink channel transmissions.

26. The method of claim 15, wherein receiving the one or more physical sidelink channel transmissions comprises:
receiving the one or more physical sidelink channel transmissions in accordance with the indicated configuration for sidelink reference signal bundling and phase continuity using a first modem, associated with the sidelink communications link, that is different than a second modem associated with communications between the first wireless device and a network entity.

27. The method of claim 15, wherein the configuration for sidelink reference signal bundling and phase continuity between physical sidelink channel transmissions of the sidelink communications link is associated with sidelink reference signal bundling and phase continuity between physical sidelink control channel transmissions, physical sidelink shared channel transmissions, or physical sidelink feedback channel transmissions, or a combination thereof.

28. The method of claim 15, wherein the indication of the capability of the second wireless device to support the configuration for sidelink reference signal bundling and phase continuity between physical sidelink channel transmissions of the sidelink communications link comprises a respective capability indication for each physical sidelink channel of a set of one or more physical sidelink channels, for each resource pool of a set of one or more resource pools, or for a combination thereof.

29. An apparatus for wireless communication, comprising:
a processor;
memory coupled with the processor; and
instructions stored in the memory and executable by the processor to cause the apparatus to:
establish, at a first wireless device, a sidelink communications link with a second wireless device;
transmit, to the second wireless device, an indication of a capability of the first wireless device to support a configuration for sidelink reference signal bundling and phase continuity between physical sidelink channel transmissions of the sidelink communications link; and
transmit, by the first wireless device and based at least in part on transmitting the indication of the capability of the first wireless device, one or more physical sidelink channel transmissions to the second wireless device in accordance with the indicated configuration for sidelink reference signal bundling and phase continuity between physical sidelink channel transmissions of the sidelink communications link.

30. An apparatus for wireless communication, comprising:
a processor;
memory coupled with the processor; and
instructions stored in the memory and executable by the processor to cause the apparatus to:
establish, at a first wireless device, a sidelink communications link with a second wireless device;
receive, from the second wireless device, an indication of a capability of the second wireless device to support a configuration for sidelink reference signal bundling and phase continuity between physical sidelink channel transmissions of the sidelink communications link; and
receive, by the first wireless device and based at least in part on receiving the indication of the capability of the second wireless device, one or more physical sidelink channel transmissions from the second wireless device in accordance with the indicated configuration for sidelink reference signal bundling and phase continuity between physical sidelink channel transmissions of the sidelink communications link.

* * * * *